(12) United States Patent
Bonsignore et al.

(10) Patent No.: US 12,031,808 B2
(45) Date of Patent: Jul. 9, 2024

(54) DETECTOR WITH A PROJECTOR FOR ILLUMINATING AT LEAST ONE OBJECT

(71) Applicant: trinamix GmbH, Ludwigshafen am Rhein (DE)

(72) Inventors: Christian Bonsignore, Ludwigshafen am Rhein (DE); Nils Berner, Ludwigshafen am Rhein (DE); Benjamin Rein, Ludwigshafen am Rhein (DE); Robert Send, Karlsruhe (DE)

(73) Assignee: TRINAMIX GMBH, Ludwigshafen am Rhein (DE)

(*) Notice: Subject to any disclaimer, the term of this patent is extended or adjusted under 35 U.S.C. 154(b) by 330 days.

(21) Appl. No.: 17/431,921

(22) PCT Filed: Feb. 20, 2020

(86) PCT No.: PCT/EP2020/054469
§ 371 (c)(1),
(2) Date: Aug. 18, 2021

(87) PCT Pub. No.: WO2020/169727
PCT Pub. Date: Aug. 27, 2020

(65) Prior Publication Data
US 2022/0146250 A1  May 12, 2022

(30) Foreign Application Priority Data
Feb. 20, 2019 (EP) .................................... 19158331

(51) Int. Cl.
*G01B 11/03* (2006.01)
*G01B 11/25* (2006.01)
(Continued)

(52) U.S. Cl.
CPC .......... *G01B 11/03* (2013.01); *G01B 11/2513* (2013.01); *G01S 17/89* (2013.01); *G01S 17/48* (2013.01)

(58) Field of Classification Search
CPC . G01B 11/03; G01B 11/2513; G01B 11/2509; G01B 11/2518; G01B 11/2522;
(Continued)

(56) References Cited

U.S. PATENT DOCUMENTS

| | | |
|---|---|---|
| 2004/0105100 A1 | 6/2004 | Shirley |
| 2010/0008588 A1 | 1/2010 | Feldkhun et al. |

(Continued)

FOREIGN PATENT DOCUMENTS

| | | |
|---|---|---|
| WO | 2014097181 A1 | 6/2014 |
| WO | 2018091638 A1 | 5/2018 |

(Continued)

OTHER PUBLICATIONS

International Search Report and Written Opinion for corresponding PCT/EP2020/054469 mailed May 12, 2020, 13 Pages.
(Continued)

*Primary Examiner* — Christina A Riddle
(74) *Attorney, Agent, or Firm* — Armstrong Teasdale LLP

(57) ABSTRACT

Described herein is a projector for illuminating at least one object with at least two illumination patterns. The projector includes at least one tunable laser source and at least one diffractive optical element. The projector is configured to generate the at least two illumination patterns each including a plurality of illumination features by controlling at least one property of the tunable laser source. The projector includes at least one control unit. The control unit is configured for controlling the at least one property of the tunable laser source.

21 Claims, 3 Drawing Sheets

(51) Int. Cl.
*G01S 17/89* (2020.01)
*G01S 17/48* (2006.01)

(58) Field of Classification Search
CPC . G01B 11/2527; G01B 11/005; G01B 11/002; G01B 11/14; G01B 11/22; G01B 11/24; G01B 11/2441; G01B 11/2531; G01B 11/2536; G01S 17/89; G01S 17/48; G01S 17/894; G01S 17/90; G01S 7/4815; G01S 7/4818; G01S 7/484; G01S 7/486; G01S 7/499; H04N 13/254; H04N 13/207; G01C 3/08; G01C 3/00; G01C 3/02; G01C 3/06; G01C 3/085
USPC ........................................ 356/601–624, 3–22
See application file for complete search history.

(56) References Cited

U.S. PATENT DOCUMENTS

| | | |
|---|---|---|
| 2012/0008588 A1 | 1/2012 | Chung et al. |
| 2012/0019809 A1 | 1/2012 | Shirley et al. |
| 2016/0023837 A1 | 1/2016 | Furneaux et al. |
| 2016/0238377 A1* | 8/2016 | Palmen .............. G01B 11/2531 |
| 2017/0180708 A1* | 6/2017 | Hazeghi ............... H04N 13/254 |

FOREIGN PATENT DOCUMENTS

| | | | |
|---|---|---|---|
| WO | 2018091640 A2 | 5/2018 | |
| WO | 2018091649 A1 | 5/2018 | |
| WO | WO-2018091638 A1 * | 5/2018 | ........... G01B 11/026 |
| WO | 2019042956 A1 | 3/2019 | |

OTHER PUBLICATIONS

R. A. Street et al. (ED.): Technology and Applications of Amorphous Silicon, Springer-verlag Hedelberg, 2010, pp. 346-349.

* cited by examiner

DETECTOR WITH A PROJECTOR FOR ILLUMINATING AT LEAST ONE OBJECT

CROSS-REFERENCE TO RELATED APPLICATIONS

This application is a U.S. National Phase Application of International Patent Application No. PCT/EP2020/054469, filed Feb. 20, 2020, which claims priority to European Patent Application No. 19158331.9, filed Feb. 20, 2019, the entire contents of which are hereby incorporated by reference herein.

FIELD OF THE INVENTION

The invention relates to a projector, a detector and a method for determining a position of at least one object. The invention further relates to a human-machine interface for exchanging at least one item of information between a user and a machine, an entertainment device, a tracking system, a camera, a scanning system and various uses of the detector device. The devices, methods and uses according to the present invention specifically may be employed for example in various areas of daily life, gaming, traffic technology, production technology, security technology, photography such as digital photography or video photography for arts, documentation or technical purposes, medical technology or in the sciences. Further, the invention specifically may be used for scanning one or more objects and/or for scanning a scenery, such as for generating a depth profile of an object or of a scenery, e.g. in the field of architecture, metrology, archaeology, arts, medicine, engineering or manufacturing. However, other applications are also possible.

PRIOR ART

A large number of optical devices are known from the prior art using triangulation imaging methods. For example, structured light methods or stereo methods are known. For example, passive stereo methods using two cameras in a fixed relative orientation or active stereo technologies are known, where an additional light projector is used. Another example is the structures light approach, where one light projector and one camera in a fixed relative orientation are used. In order to determine a depth image via triangulation, the correspondence problem has to be solved first. Therefore, in passive stereo camera techniques enough corresponding feature points have to be identified in both camera views. In structured light approaches correspondences between pre-stored and projected pseudo random light patterns have to be determined. For a robust solution of these correspondence problems computational imaging algorithms such as algorithms scaling approximately quadratically with the number of points in the projected point pattern have to be employed. In structured light methods, for example, using a stereo system comprising two detectors having a fixed relative distance, a light source projects a pattern such as points, pseudo-random, random, non-periodic or irregular point patterns, or the like. Each of the detectors generates an image of a reflection pattern and an image analysis task is to identify corresponding features in the two images. Due to fixed relative position a corresponding feature point selected in one of the two images lies along an epipolar line in the other image. However, solving the so-called correspondence problem may be difficult. In stereo and triangulation systems, the distance of all feature points along the epipolar line have to have reasonable correspondence among each other. A correspondence decision cannot be made one after another. If one correspondence is wrong, this has implications for other feature points, such as invisibility. This usually yields quadratic scaling evaluation algorithms. These evaluation algorithms used require high computation power which is a severe cost driver. Furthermore, due to energy consumption and heat production of the required computational resources, the computational demand limits use of such 3D sensor methods in outdoor and mobile applications.

US 2016/0238377 A1 describes a modeling arrangement for modeling the topography of a three dimensional surface. The arrangement includes a light source arranged to produce substantially monochromatic and coherent electromagnetic radiation; a camera arranged to photograph the surface to be modeled at wavelengths emitted by the light source as well as wavelengths detected by the human eye; and a grating provided in connection with the first light source. The light source and the grating provided in connection with the light source are arranged jointly to produce a diffraction pattern of a known geometry on the surface to be modeled. Thus, for generating diffraction patterns several laser diodes at different wavelengths are used in combination with one diffractive optical element. For example, using a green and a red laser diode results in two different patterns.

A new concept of distance measurement determining the distance by using photon ratio (DPR) is described in WO 2018/091649 A1, WO 2018/091638 A1 and WO 2018/091640 A1, the content of which is included by reference. Moreover, international patent application PCT/EP2018/073067 filed on Aug. 28, 2018, the content of which is included by reference, describes a detector for determining a position of at least one object. The detector comprises—at least one sensor element having a matrix of optical sensors, the optical sensors each having a light-sensitive area, wherein each optical sensor is designed to generate at least one sensor signal in response to an illumination of its respective light-sensitive area by a reflection light beam propagating from the object to the detector, wherein the sensor element is configured for determine at least one reflection image; —at least one evaluation device, wherein the evaluation device is configured for select at least one reflection feature of the reflection image, wherein the evaluation device is configured for determining at least one longitudinal region of the selected reflection feature of the reflection image by evaluating a combined signal Q from the sensor signals, wherein the evaluation device is configured for determine at least one displacement region in at least one reference image corresponding to the longitudinal region, wherein the evaluation device is configured for match the selected reflection feature with at least one reference feature within the displacement region.

Light projectors used with depth from photon ratio technology are configured for illumination with a single pattern. The single pattern usually has a low density of points as the technology requires. As a consequence, not all areas of interest may be covered by a projected point and thus by a measurement. Furthermore, the single pattern may not be ideal for both bright and dark objects. Light projectors such as LCOS (Liquid Crystal on Silicon) and DLP (Digital Light Processing) based projectors are able to project a flexible pattern but these projectors are very cost intensive.

In addition, in the depth from photon ratio setups, points are projected onto the object using a laser and DOE combination. Despite all advantages of the laser light sources, the disadvantages may be speckles in the recorded beam profile. These speckles may originate from interferences of the coherent light on rough surfaces. The speckles may result in that the beam profile has spikes of high intensity that deteriorate the measurement. It would therefore be desirable to avoid speckles by altering the light sources without introducing the drawbacks of incoherent light sources.

US 2012/019809 A1 describes an apparatus that includes a processor coupled with a memory where the processor is operable to obtain a first speckled pattern of a first defocused image of a neighborhood of a location on an object, to obtain a second speckled pattern of a second defocused image of the neighborhood, to determine a shift between the first and second speckle patterns, and to calculate slope information of a surface profile at the location based on the determined shift.

US 2010/008588 A1 describes methods, systems, and apparatuses for estimating a location on an object in a three-dimensional scene. Multiple radiation patterns are produced by spatially modulating each of multiple first radiations with a distinct combination of one or more modulating structures, each first radiation having at least one of a distinct radiation path, a distinct source, a distinct source spectrum, or a distinct source polarization with respect to the other first radiations. The location on the object is illuminated with a portion of each of two or more of the radiation patterns, the location producing multiple object radiations, each object radiation produced in response to one of the multiple radiation patterns. Multiple measured values are produced by detecting the object radiations from the location on the object due to each pattern separately using one or more detector elements. The location on the object is estimated based on the multiple measured values.

US 2004/105100 A1 describes an apparatus for projecting fringes onto a surface of an object including two sources of radiation separated by a distance, each source having a spectral distribution, and being coherent with respect to the other of the sources, a control system moving each of the sources relative to the other of the sources, and a detector positioned to receive radiation scattered from the point on the surface of the object.

Problem Addressed by the Invention

It is therefore an object of the present invention to provide devices and methods facing the above-mentioned technical challenges of known devices and methods. Specifically, it is an object of the present invention to provide devices and methods which reliably may determine a position of an object in space, preferably with a low technical effort and with low requirements in terms of technical resources and cost.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way.

The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such a way with other optional or non-optional features of the invention.

In a first aspect of the present invention a projector for illuminating at least one object with at least two illumination patterns is disclosed. The projector comprises at least one tunable laser source and at least one diffractive optical element. The projector is configured to generate the at least two illumination patterns each comprising a plurality of illumination features by controlling at least one property of the tunable laser source. The projector comprises at least one control unit. The control unit is configured for controlling the at least one property of the tunable laser source.

As used herein, the term "object" refers to an arbitrary object, in particular a surface or region, which is configured to reflect at least partially at least one light beam impinging on the object. The light beam may originate from the projector illuminating the object, wherein the light beam is reflected or scattered by the object.

As used herein, the term "projector", also denoted as light projector, refers to an optical device configured to project at least one illumination pattern onto the object, specifically onto a surface of the object. The projector comprises the at least one tunable laser source, in particular for generating at least one light beam. The projector comprises the at least one diffractive optical element, in particular for generating and/or forming the illumination pattern from the light beam of the tunable laser source. The projector may be configured such that the illumination patterns propagate from the projector, in particular from at least one opening of a housing of the projector, towards the object. Additionally, an additional illumination pattern may be generated by at least one ambient light source. The projector is configured to generate the at least two illumination patterns each comprising a plurality of illumination features. The projector may be configured to project two, three, four, five or more illumination patterns each comprising a plurality of illumination features. The illumination patterns may differ, specifically in one or more of number of illumination features, arrangement of illumination features, shape of illumination features, wavelength of illumination features, intensity of illumination features, opening angle and the like.

As used herein, the term "pattern" refers to an arbitrary known or pre-determined arrangement comprising at least one arbitrarily shaped feature. The pattern may comprise at least one feature such as a point or symbol. The pattern may comprise a plurality of features. The pattern may comprise an arrangement of periodic or non-periodic features. As used herein, the term "illumination pattern" refers to a pattern which illuminates the object. Each of the illumination patterns may comprise at least one pattern selected from the group consisting of: at least one point pattern, in particular a pseudo-random point pattern; a random point pattern or a quasi random pattern; at least one Sobol pattern; at least one quasiperiodic pattern; at least one pattern comprising at least one pre-known feature at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines. For example, the projector may be configured for generate and/or to project a cloud of points. For example, the projector may be configured for generate a cloud of points such that the illumination patterns may comprise a plurality of point features. The projector may comprise the diffractive optical element configured for generate the illumination patterns from at least one light beam generated by the tunable laser source. For example, each of the illumination patterns may comprise at least one line. For example, the tunable laser source may comprise at least one line laser. The line laser may be configured for send a laser line to the object, for example a horizontal or vertical laser line. For example, the projector may comprise at least two tunable line lasers, or one tunable line laser and a non-tunable line laser, which may be arranged such that each of the illumination patterns comprises at least two parallel or crossing lines.

The illumination patterns may comprise regular and/or constant and/or periodic patterns such as a triangular pattern, a rectangular pattern, a hexagonal pattern, or a pattern comprising further convex tilings. The illumination patterns may comprise as many features per area as possible such that a hexagonal pattern may be preferred. A distance between two features of the respective illumination pattern and/or an area of the at least one illumination feature may depend on a circle of confusion in an image determined by at least one optical sensor as described below.

The projector comprises the at least one tunable laser source and the at least one diffractive optical element (DOE). As used herein, the term "diffractive optical element" refers to an optical element configured to generate and/or to form an illumination pattern in response to a light beam generated by the tunable laser source impinging on the DOE. The illumination pattern generated and/or formed by the DOE may be wavelength dependent. Specifically, the illumination patterns generated and/or formed by the DOE may be interference patterns which are strongly wavelength dependent. The projector may comprise an equal number of tunable laser sources and diffractive optical elements. The projector may comprise one diffractive optical element and one laser source. Thus, the projector may be configured to project two different illumination patterns, e.g. differing in wavelength, using only one laser source and one diffractive optical element.

The term "laser source" specifically refers to a light source configured to emit radiation coherently. The laser source may comprise only a single gain medium, such as a single semiconductor component configured for emitting coherent radiation. In particular, the laser source may comprise a single semiconductor component configured for emitting coherent radiation, specifically at a single central or mean wavelength. An emission spectrum of the laser source may be characterized by an emission range within less than 15% of the mean emission wavelength, preferably less than 10% of the mean emission wavelength, more preferably less than 5% of the mean emission wavelength. Known projectors require several light sources for generating different patterns, e.g. as described in US 2016/0238377 A1, wherein superimposing the light of different wavelengths results in loss of coherence of the radiation. In contrast, the present invention proposes providing coherent radiation to the DOE and generating different patterns by tuning the laser source. As further used herein, the term "tunable laser source" refers to a laser source having at least property which can be controlled and/or adjusted. For example, the tunable laser source may comprise one or more of a semiconductor tunable laser, a Sample Grating Distributed Bragg Reflector laser (SG-DBR), an external cavity laser, for example using a (Micro Electro Mechanical System) MEMS structure, a diode laser, a vertical cavity surface-emitting laser (VC-SEL), a vertical cavity surface-emitting laser array, a distributed feedback laser, or the like. The tunable laser source may be tunable over a wavelength range from 350 to 1500 nm, preferably from 400 to 1100 nm, more preferably from 700 to 1000 nm, most preferably from 980-770 nm. Examples for tunable laser sources can be found e.g. in https://en.wikipedia.org/wiki/Tunable_laser. The tunable laser source may comprise a driver, specifically a tunable driver. The tunable laser source may comprise focusing optics. The at least one property of the tunable laser source may be at least one property selected from the group consisting of a voltage, a current, a temperature, an emission wavelength, an intensity and the like. For example, the emission wavelength of the tunable laser source may be adjustable by one or more of varying a driver current, changing a MEMS state, changing the modulation of an electro-optical or an acousto-optical modulator or the like. In particular, the emission wavelength of the coherent light emitted by the tunable laser source may depend on the driver current by which the tunable laser source is driven and/or the temperature. The projector is configured to generate the at least two illumination patterns by controlling the at least one property of the tunable laser source. As each of the illumination patterns generated and/or formed by the DOE is strongly wavelength dependent, when the emission wavelength changes the illumination pattern changes, too. The projector may comprise a plurality of tunable laser sources.

The projector comprises the at least one control unit. The control unit is configured for controlling the at least one property of the tunable laser source. The control unit may be configured to control the at least one property of the tunable laser source by applying an electrical signal to the tunable laser source. As used herein, the term "controlling the at least one property of the tunable laser source" refers to adjusting and/or setting and/or tuning the at least one property. For example, the control unit may be configured to vary the driver current and/or to change the MEMS state and/or to change the modulation of an electro-optical or acousto-optical modulator or the like.

As further used herein, the term "control unit" generally refers to an arbitrary device configured to control operation of the tunable laser source and/or to control the at least one property of the tunable laser source. The control unit may comprise at least one processing device, in particular at least one processor and/or at least one application-specific integrated circuit (ASIC). The control unit may comprise one or more programmable devices such as one or more computers, application-specific integrated circuits (ASICs), Digital Signal Processors (DSPs), or Field Programmable Gate Arrays (FPGAs) which are configured to perform the controlling of the tunable laser source. The control unit may comprise at least one processing device having a software code stored thereon comprising a number of computer commands. The control unit may provide one or more hardware elements for performing controlling the tunable laser source and/or may provide one or more processors with software running thereon for performing controlling of the tunable laser source. The control unit may be configured to issue and/or to generate at least one electronic signal for controlling the tunable laser source. The control unit may have one or more wireless and/or wire-bound interfaces and/or other types of control connections for controlling the tunable laser source. The control unit and the tunable laser source may be interconnected by one or more connectors and/or by one or more interfaces.

The tunable laser source may be configured for emitting light in the infrared spectral range. It shall be noted, however, that other spectral ranges are feasible, additionally or alternatively. Further, the projector specifically may be configured for emitting modulated or non-modulated light. In case a plurality of tunable laser sources is used, the different tunable laser sources may have different modulation frequencies which later on may be used for distinguishing the light beams, specifically the respective illumination pattern.

The projector may be operable in at least two emission modes. As used herein, the term "emission mode" refers to at least one property of the emission light beam emitted by the tunable laser, wherein different emission modes differ by the at least one property of the emission light beam, such as emission wavelength, emission intensity and the like. The emission mode may be adjusted by setting and/or adjusting the property of the emission light beam of the tunable laser source. The control unit may be configured to adjust the emission mode by applying an electrical signal to the tunable laser source. For example, in a first emission mode the tunable laser source may have a first emission wavelength $\lambda_1$ and in a second emission mode the tunable laser source may have a second emission wavelength $\lambda_2$ different from the first emission wavelength $\lambda_1$. The emission wavelength of the tunable laser source may be adjustable by one or more of varying the driver current, changing the MEMS state, changing the modulation of the electro-optical or acousto-optical modulator or the like. The control unit may be configured to adjust the emission wavelength in steps or continuously. The projector may be configured to project the two illumination patterns to at least partly differing locations. The control unit may be configured to adjust the emission wavelength in steps or continuously thereby adjusting the location of the illumination patterns. By adjusting the emission wavelength, a position of the illumination features of the illumination pattern such as of light spots may change on the object. As used herein, a "light spot" generally refers to a visible or detectable round or non-round illumination of the object by a light beam. Usually, in projectors for structured light measurements, changes in wavelength are strictly avoided to ensure stable measurements. However, in case of the depth from photon ratio technique where the measurement relies on single points only, it is desirable to project point patterns to differing locations with a simple setup. The movement of the illumination feature on the object may be small compared to the distance between two illumination features. The control unit may be configured to adjust the emission wavelength in steps, wherein the step size is within a range from 0.001 to 5 nm, preferably within a range from 0.01 to 0.5 nm, most preferably within a range from 0.05 to 0.15 nm. Such a small step size may allow shifting the illumination pattern according to a 2D-picture of a sensor element such as a CMOS in order to illuminate a certain region of the object.

The at least two emission wavelengths of the tunable laser source may be clearly separated and stable. Separation may ensure that the DOE can be designed for two well specified wavelengths. The first emission wavelength $\lambda_1$ and the second emission wavelength $\lambda_2$ may be separable. The first emission wavelength $\lambda_1$ and the second emission wavelength $\lambda_2$ may differ by 40 nm$\geq|\lambda_1-\lambda_2|\geq 1$ nm, preferably by 30 nm$\geq|\lambda_1-\lambda_2|\geq 2.5$ nm, more preferably by 20 nm$\geq|\lambda_1-\lambda_2|\geq 4$ nm. The first emission wavelength $\lambda_1$ and the second emission wavelength $\lambda_2$ may be stable. Stability may be important concerning a variation around the emission wavelength as this may vary the illumination pattern or features of the pattern in an undesired way. As used herein, the term "stable" refers to variations in wavelength only within certain, specifically predetermined or pre-defined, limits. Variations in wavelength $\Delta\lambda$ may be small compared to the wavelength, wherein $\Delta\lambda\leq 1.5\%$, preferably $\Delta\lambda\leq 0.5\%$, more preferably $\Delta\lambda\leq 0.1\%$. Moreover, well specified emission wavelengths and stability may be desired for triangulation based depth from photon ratio measurements such as described in international patent application PCT/EP2018/073067 filed on Aug. 28, 2018, the content of which is included by reference, where a correspondence between the electronic signal determining the emission mode and the illumination pattern is necessary for a clearly defined and known reference pattern in order to allow a reliable comparison of a reflection image, specifically a reflection pattern, with the reference pattern.

The emission modes may differ in intensity. This may improve a dynamic range of the measurement. As an example, a dark object may be measured in a high intensity emission mode. A bright object may be measured in a low intensity emission mode.

The illumination patterns generated in different emission modes may have different opening angles. As used herein, the term "opening angle" refers to angle between a straight line connecting an exit pupil of the projector and the outermost illumination feature of the illumination pattern at a certain distance from the exit pupil, e.g. at the object distance, and an optical axis of the projector. A measurable field may be proportional, specifically linear proportional, to the opening angle of the illumination pattern. Specifically, the measurable field may correspond to an area, e.g. on the surface of the object, covered by the illumination pattern. The opening angles of two patterns may differ by 0.5° or more, preferably by 1.5° or more, more preferably by 2.5° or more. Thus, the measurable field of view may be changed by changing the emission mode.

A minimal distance where the diffractive optical element generates the illumination patterns may change upon changing the emission mode. As used herein, the term "the minimal distance where the diffractive optical element generates the illumination patterns" refers to a lower limit of a measurement range of a detector which will be described in more detail below. Thus, the emission mode change may also allow changing the measurement range of the detector.

The tunable laser source may be configured to generate at least one light pulse. As used herein, the term "light pulse" refers to a non-continuous light beam having a certain pulse length. As used herein, the term "ray" generally refers to a line that is perpendicular to wavefronts of light which points in a direction of energy flow. As used herein, the term "beam" generally refers to a collection of rays. In the following, the terms "ray" and "beam" will be used as synonyms. As further used herein, the term "light beam" generally refers to an amount of light, specifically an amount of light traveling essentially in the same direction, including the possibility of the light beam having a spreading angle or widening angle. The light pulse may comprise at least one beam profile. The light beam may have a spatial extension. Specifically, the light beam may have a non-Gaussian beam profile. The beam profile may be selected from the group consisting of a trapezoid beam profile; a triangle beam profile; a conical beam profile. The trapezoid beam profile may have a plateau region and at least one edge region. The light beam may be a Gaussian light beam or a linear combination of Gaussian light beams. As used herein, the term "beam profile" relates to a spatial distribution, in particular in at least one plane perpendicular to the propagation of the light beam, of an intensity of the light beam. The beam profile may be a transverse intensity profile of the light beam. The beam profile may be a cross section of the light beam. The beam profile may be selected from the group consisting of a trapezoid beam profile; a triangle beam profile; a conical beam profile and a linear combination of Gaussian beam profiles. Other embodiments are feasible, however. The projector may comprise at least one transfer device which may be configured for one or more of adjusting, defining and determining the beam profile, in particular a shape of the beam profile. The control unit may be configured to adjust a wavelength of the light pulse such that the wavelength within the beam profile of the light pulse varies by a wavelength variation $\Delta\Lambda$ by applying an electrical signal to the tunable laser source and/or to adjust wavelengths of light pulses of a series of light pulses such that the wavelengths of at least two light pulses of the series of light pulses vary by the wavelength variation $\Delta\Lambda$. The wavelength of the light pulse may be adjustable by one or more of varying a driver current, changing a MEMS state, changing the modulation of an electro-optical or acousto-optical modulator or the like. The wavelength may be varied within the light pulse or within a series of pulses. Thereby, the position of the projected illumination feature, e.g. of a light spot, will slightly move on the object as described above. The movement of one of the illumination feature may be small compared to the distance between adjacent illumination features. The wavelength variation $\Delta\Lambda$ may be small compared to the wavelength. For example, the wavelength variation may be within a range of $0.01\% \leq |\Delta\Lambda| \leq 10\%$, preferably $0.02\% \leq |\Delta\Lambda| \leq 2\%$, more preferably $0.075\% \leq |\Delta\Lambda| \leq 0.75\%$. The light pulse or series of light pulses may preferably be within a single frame recording of the sensor element such as of a CMOS. Preferably, as will be described in more detail below, a global shutter CMOS may be used. Usage of laser sources generally may lead to speckles in the beam profile recorded by the sensor element. The wavelength variation may result in that the sensor element records an average of the speckle pattern while the movement of the illumination features may be almost unnoticed. Thus, the tunable laser source itself may average the speckles without giving up its coherence and without use of speckle reducing optical elements. This may allow reducing dependence of the distance measurement on surface roughness and generally increases measurement accuracy.

In a further aspect of the present invention, a detector for determining a position of at least one object is disclosed. The detector comprises at least one projector according to the present invention, such as according to one or more of the embodiments disclosed above or according to one or more of the embodiments disclosed in further detail below.

As used herein, the term "position" refers to at least one item of information regarding a location and/or orientation of the object and/or at least one part of the object in space. Thus, the at least one item of information may imply at least one distance between at least one point of the object and the at least one detector. The distance may be a longitudinal coordinate or may contribute to determining a longitudinal coordinate of the point of the object. Additionally or alternatively, one or more other items of information regarding the location and/or orientation of the object and/or at least one part of the object may be determined. As an example, additionally, at least one transversal coordinate of the object and/or at least one part of the object may be determined. Thus, the position of the object may imply at least one longitudinal coordinate of the object and/or at least one part of the object. Additionally or alternatively, the position of the object may imply at least one transversal coordinate of the object and/or at least one part of the object. Additionally or alternatively, the position of the object may imply at least one orientation information of the object, indicating an orientation of the object in space.

The detector comprises:
 at least one sensor element having a matrix of optical sensors, the optical sensors each having a light-sensitive area, wherein each optical sensor is designed to generate at least one sensor signal in response to an illumination of its respective light-sensitive area by a reflection light beam propagating from the object to the detector, wherein the sensor element is configured to determine at least one reflection image;
 at least one evaluation device, wherein the evaluation device is configured for select at least one reflection feature of the reflection image, wherein the evaluation device is configured for determining at least one longitudinal coordinate z of the selected reflection feature of the reflection image by evaluating a combined signal Q from the sensor signals.

As used herein, the term "sensor element" generally refers to a device or a combination of a plurality of devices configured for sensing at least one parameter. In the present case, the parameter specifically may be an optical parameter, and the sensor element specifically may be an optical sensor element. The sensor element may be formed as a unitary, single device or as a combination of several devices. As further used herein, the term "matrix" generally refers to an arrangement of a plurality of elements in a predetermined geometrical order. The matrix, as will be outlined in further detail below, specifically may be or may comprise a rectangular matrix having one or more rows and one or more columns. The rows and columns specifically may be arranged in a rectangular fashion. It shall be outlined, however, that other arrangements are feasible, such as nonrectangular arrangements. As an example, circular arrangements are also feasible, wherein the elements are arranged in concentric circles or ellipses about a center point. For example, the matrix may be a single row of pixels. Other arrangements are feasible. The optical sensors of the matrix specifically may be equal in one or more of size, sensitivity and other optical, electrical and mechanical properties. The light-sensitive areas of all optical sensors of the matrix specifically may be located in a common plane, the common plane preferably facing the object, such that a light beam propagating from the object to the detector may generate a light spot on the common plane.

As used herein, an "optical sensor" generally refers to a light-sensitive device for detecting a light beam, such as for detecting an illumination and/or a light spot generated by at least one light beam. As further used herein, a "light-sensitive area" generally refers to an area of the optical sensor which may be illuminated externally, by the at least one light beam, in response to which illumination the at least one sensor signal is generated. The light-sensitive area may specifically be located on a surface of the respective optical sensor. Other embodiments, however, are feasible. As used herein, the term "the optical sensors each having at least one light sensitive area" refers to configurations with a plurality of single optical sensors each having one light sensitive area and to configurations with one combined optical sensor having a plurality of light sensitive areas. Thus, the term "optical sensor" furthermore refers to a light-sensitive device configured to generate one output signal, whereas, herein, a light-sensitive device configured to generate two or more output signals, for example at least one CCD and/or CMOS device, is referred to as two or more optical sensors. As will further be outlined in detail below, each optical sensor may be embodied such that precisely one light-sensitive area is present in the respective optical sensor, such as by providing precisely one light-sensitive area which may be illuminated, in response to which illumination precisely one uniform sensor signal is created for the whole optical sensor. Thus, each optical sensor may be a single area optical sensor. The use of the single area optical sensors, however, renders the setup of the detector specifically simple and efficient. Thus, as an example, commercially available photo-sensors, such as commercially available silicon photodiodes, each having precisely one sensitive area, may be used in the setup. Other embodiments, however, are feasible. Thus, as an example, an optical device comprising two, three, four or more than four light-sensitive areas may be used which is regarded as two, three, four or more than four optical sensors in the context of the present invention. As outlined above, the sensor element comprises a matrix of optical sensors. Thus, as an example, the optical sensors may be part of or constitute a pixelated optical device. As an example, the optical sensors may be part of or constitute at least one CCD and/or CMOS device having a matrix of pixels, each pixel forming a light-sensitive area.

Preferably the detector is configured such that the optical sensors are exposed simultaneously within a certain time period, denoted as frame or imaging frame. For example, the optical sensors may be part of or constitute at least one global shutter CMOS. The sensor element may be configured to determine the reflection image within at least one imaging frame. Duration of a single imaging frame may correspond to a pulse duration of the tunable laser source of the projector or a duration of a series of pulses of the tunable laser source of the projector. A series of pulses may comprise a plurality of pulses, wherein the number of pulses per pulse sequence is in a range from 2 to 20000 pulses, preferably in a range from 5 to 10000 pulses, more preferably in a range from 10 to 1000 pulses. As outlined above, the control unit of the projector may be configured to adjust a wavelength of the light pulse such that the wavelength within the beam profile of the light pulse varies by a wavelength variation $\Delta\Lambda$ by applying an electrical signal to the tunable laser source and/or to adjust wavelengths of light pulses of a series of light pulses such that the wavelengths of at least two light pulses of the series of light pulses vary by the wavelength variation $\Delta\Lambda$. Thereby, the position of the projected illumination feature, e.g. of a light spot, will slightly move on the object as described above. The detector may be designed such that the light pulse or series of light pulses may be within a single frame recording of the sensor element. The wavelength variation may result in that the sensor element records an average of the speckle pattern while the movement of the illumination features may be almost unnoticed by the sensor element. Thus, the tunable laser source itself may average the speckles without giving up its coherence and without use of speckle reducing optical elements. The variations in wavelength may remove the speckles and gives an average spot profile with an improved distance measurement results.

As outlined above, the optical sensors specifically may be or may comprise photodetectors, preferably inorganic photodetectors, more preferably inorganic semiconductor photodetectors, most preferably silicon photodetectors. Specifically, the optical sensors may be sensitive in the infrared spectral range. All of the optical sensors of the matrix or at least a group of the optical sensors of the matrix specifically may be identical. Groups of identical optical sensors of the matrix specifically may be provided for different spectral ranges, or all optical sensors may be identical in terms of spectral sensitivity. Further, the optical sensors may be identical in size and/or with regard to their electronic or optoelectronic properties.

Specifically, the optical sensors may be or may comprise inorganic photodiodes which are sensitive in the infrared spectral range, preferably in the range of 780 nm to 3.0 micrometers. Specifically, the optical sensors may be sensitive in the part of the near infrared region where silicon photodiodes are applicable specifically in the range of 700 nm to 1000 nm. Infrared optical sensors which may be used for optical sensors may be commercially available infrared optical sensors, such as infrared optical sensors commercially available under the brand name Hertzstueck™ from trinamiX GmbH, D-67056 Ludwigshafen am Rhein, Germany. Thus, as an example, the optical sensors may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the optical sensors may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the optical sensors may comprise at least one bolometer, preferably a bolometer selected from the group consisting of a VO bolometer and an amorphous Si bolometer.

The matrix may be composed of independent optical sensors. Thus, a matrix may be composed of inorganic photodiodes. Alternatively, however, a commercially available matrix may be used, such as one or more of a CCD detector, such as a CCD detector chip, and/or a CMOS detector, such as a CMOS detector chip.

Thus, generally, the optical sensors of the detector may form a sensor array or may be part of a sensor array, such as the above-mentioned matrix. Thus, as an example, the detector may comprise an array of optical sensors, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that 0.3≤m/n≤3, such as by choosing m/n=1:1, 4:3, 16:9 or similar. As an example, the array may be a square array, having an equal number of rows and columns, such as by choosing m=2, n=2 or m=3, n=3 or the like.

The matrix specifically may be a rectangular matrix having at least one row, preferably a plurality of rows, and a plurality of columns. As an example, the rows and columns may be oriented essentially perpendicular, wherein, with respect to the term "essentially perpendicular", reference may be made to the definition given above. Thus, as an example, tolerances of less than 20°, specifically less than 10° or even less than 5°, may be acceptable. In order to provide a wide range of view, the matrix specifically may have at least 10 rows, preferably at least 50 rows, more preferably at least 100 rows. Similarly, the matrix may have at least 10 columns, preferably at least 50 columns, more preferably at least 100 columns. The matrix may comprise at least 50 optical sensors, preferably at least 100 optical sensors, more preferably at least 500 optical sensors. The matrix may comprise a number of pixels in a multi-mega pixel range. Other embodiments, however, are feasible. Thus, in setups in which an axial rotational symmetry is to be expected, circular arrangements or concentric arrangements of the optical sensors of the matrix, which may also be referred to as pixels, may be preferred.

Preferably, the sensor element may be oriented essentially perpendicular to an optical axis of the detector. Again, with respect to the term "essentially perpendicular", reference may be made to the definition and the tolerances given above. The optical axis may be a straight optical axis or may be bent or even split, such as by using one or more deflection elements and/or by using one or more beam splitters, wherein the essentially perpendicular orientation, in the latter cases, may refer to the local optical axis in the respective branch or beam path of the optical setup.

The reflection light beam may propagate from the object towards the detector. As will be outlined in further detail below, the reflection light beam may originate from the object. The projector may illuminate the object with the at least two illumination patterns and the light is reflected or scattered by the object and, thereby, is at least partially directed as reflection light beam towards the detector.

The reflection light beam specifically may fully illuminate the sensor element such that the sensor element is fully located within the light beam with a width of the light beam being larger than the matrix. Contrarily, preferably, the reflection light beam specifically may create a light spot on the entire matrix which is smaller than the matrix, such that the light spot is fully located within the matrix. This situation may easily be adjusted by a person skilled in the art of optics by choosing one or more appropriate lenses or elements having a focusing or defocusing effect on the light beam, such as by using an appropriate transfer device as will be outlined in further detail below.

As further used herein, a "sensor signal" generally refers to a signal generated by an optical sensor in response to the illumination by the light beam. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the detector, the optical sensor or any other element may be configured for process or preprocess the sensor signal, thereby generating secondary sensor signals, which may also be used as sensor signals, such as preprocessing by filtering or the like.

The light-sensitive areas specifically may be oriented towards the object. As used herein, the term "is oriented towards the object" generally refers to the situation that the respective surfaces of the light-sensitive areas are fully or partially visible from the object. Specifically, at least one interconnecting line between at least one point of the object and at least one point of the respective light-sensitive area may form an angle with a surface element of the light-sensitive area which is different from 0°, such as an angle in the range of 20° to 90°, preferably 80 to 90° such as 90°. Thus, when the object is located on the optical axis or close to the optical axis, the light beam propagating from the object towards the detector may be essentially parallel to the optical axis. As used herein, the term "essentially perpendicular" refers to the condition of a perpendicular orientation, with a tolerance of e.g. ±20° or less, preferably a tolerance of ±10° or less, more preferably a tolerance of ±5° or less. Similarly, the term "essentially parallel" refers to the condition of a parallel orientation, with a tolerance of e.g. ±20° or less, preferably a tolerance of ±10° or less, more preferably a tolerance of ±5° or less.

The optical sensors may be sensitive in one or more of the ultraviolet, the visible or the infrared spectral range. Specifically, the optical sensors may be sensitive in the visible spectral range from 500 nm to 780 nm, most preferably at 650 nm to 750 nm or at 690 nm to 700 nm. Specifically, the optical sensors may be sensitive in the near infrared region. Specifically, the optical sensors may be sensitive in the part of the near infrared region where silicon photodiodes are applicable specifically in the range of 700 nm to 1000 nm. The optical sensors, specifically, may be sensitive in the infrared spectral range, specifically in the range of 780 nm to 3.0 micrometers. For example, the optical sensors each, independently, may be or may comprise at least one element selected from the group consisting of a photodiode, a photocell, a photoconductor, a phototransistor or any combination thereof. For example, the optical sensors may be or may comprise at least one element selected from the group consisting of a CCD sensor element, a CMOS sensor element, a photodiode, a photocell, a photoconductor, a phototransistor or any combination thereof. Any other type of photosensitive element may be used. As will be outlined in further detail below, the photosensitive element generally may fully or partially be made of inorganic materials and/or may fully or partially be made of organic materials. Most commonly, as will be outlined in further detail below, one or more photodiodes may be used, such as commercially available photodiodes, e.g. inorganic semiconductor photodiodes.

The detector may be configured for determine at least one distance information of the object by using triangulation and/or structured light techniques. In known 3D sensing devices, such as devices using triangulation or structured light techniques, due to correspondence problems regular, constant or periodic pattern are not suitable since each measured point has to be assigned to one reference point of a reference pattern.

As used herein, the term "reflection image" refers to an image determined by the optical sensor comprising at least one reflection feature. As used herein, the term "reflection feature" refers to a feature in an image plane generated by the object in response to illumination, for example with at least one illumination feature. The reflection image may comprise the at least one reflection pattern comprising the at least one reflection feature. As used herein, the term "illumination feature" refers to at least one arbitrary shaped feature of the illumination pattern. As used herein, the term "determining at least one reflection image" refers to one or more of imaging, recording and generating of the reflection image. As used herein, the term "select at least one reflection feature" refers to one or more of identifying, determining and choosing at least one reflection feature of the reflection image. The detector may be configured for determine the longitudinal coordinate of an object point for at least one reflection feature of the reflection image from the combined signal. Thus, the detector may be configured for pre-classify the at least one reflection feature of the reflection image. This allows using illumination patterns comprising regular and/or constant and/or periodic pattern such as a triangular pattern, a rectangular pattern, a hexagonal pattern or a pattern comprising further convex tilings.

The evaluation device may be configured for perform at least one image analysis and/or image processing in order to identify the reflection feature. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing an object within an image generated by the optical sensors.

The evaluation device is configured for determining at least one longitudinal coordinate z of the selected reflection feature of the reflection image by evaluating a combined signal Q from the sensor signals. As used herein, the term "combined signal Q" refers to a signal which is generated by combining the sensor signals, in particular by one or more of dividing the sensor signals, dividing multiples of the sensor signals or dividing linear combinations of the sensor signals. The evaluation device may be configured for deriving the combined signal Q by one or more of dividing the sensor signals, dividing multiples of the sensor signals, dividing linear combinations of the sensor signals. The evaluation device may be configured for using at least one predetermined relationship between the combined signal Q and the longitudinal region for determining the longitudinal region. For example, the evaluation device may be configured for deriving the combined signal Q by $$Q(z_O) = \frac{\int\int_{A_1} E(x, y; z_O) dx dy}{\int\int_{A_2} E(x, y; z_O) dx dy},$$

wherein x and y are transversal coordinates, A1 and A2 are different areas of at least one beam profile of the reflection light beam at the sensor position, and $E(x,y,z_o)$ denotes the beam profile given at the object distance $z_o$. Area A1 and area A2 may differ. In particular, A1 and A2 are not congruent. Thus, A1 and A2 may differ in one or more of the shape or content.

Generally the beam profile is dependent on luminance $L(z_o)$ and beam shape $S(x,y;z_o)$, $E(x,y;z_o)=L\cdot S$. Thus, by deriving the combined signal it may allow determining the longitudinal coordinate independent from luminance. In addition, using the combined signal allows determination of the distance $z_o$ independent from the object size. Thus, the combined signal allows determination of the distance $z_o$ independent from the material properties and/or reflective properties and/or scattering properties of the object and independent from alterations of the light source such as by manufacturing precision, heat, water, dirt, damages on the lens, or the like.

Each of the sensor signals may comprise at least one information of at least one area of the beam profile of the light beam. As used herein, the term "area of the beam profile" generally refers to an arbitrary region of the beam profile at the sensor position used for determining the combined signal Q. The light-sensitive areas may be arranged such that a first sensor signal comprises information of a first area of the beam profile and a second sensor signal comprises information of a second area of the beam profile. The first area of the beam profile and second area of the beam profile may be one or both of adjacent or overlapping regions. The first area of the beam profile and the second area of the beam profile may be not congruent in area.

The evaluation device may be configured to determine and/or to select the first area of the beam profile and the second area of the beam profile. The first area of the beam profile may comprise essentially edge information of the beam profile and the second area of the beam profile may comprise essentially center information of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. As used herein, the term "essentially center information" generally refers to a low proportion of edge information, i.e. proportion of the intensity distribution corresponding to edges, compared to a proportion of the center information, i.e. proportion of the intensity distribution corresponding to the center. Preferably the center information has a proportion of edge information of less than 10%, more preferably of less than 5%, most preferably the center information comprises no edge content. As used herein, the term "essentially edge information" generally refers to a low proportion of center information compared to a proportion of the edge information. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region. The first area of the beam profile may be area A2 and the second area of the beam profile may be area A1.

Other selections of the first area A1 and second area A2 may be feasible. For example, the first area may comprise essentially outer regions of the beam profile and the second area may comprise essentially inner regions of the beam profile. For example, in case of a two-dimensional beam profile, the beam profile may be divided in a left part and a right part, wherein the first area may comprise essentially areas of the left part of the beam profile and the second area may comprise essentially areas of the right part of the beam profile.

The edge information may comprise information relating to a number of photons in the first area of the beam profile and the center information may comprise information relating to a number of photons in the second area of the beam profile. The evaluation device may be configured for determining an area integral of the beam profile. The evaluation device may be configured for determine the edge information by integrating and/or summing of the first area. The evaluation device may be configured for determine the center information by integrating and/or summing of the second area. For example, the beam profile may be a trapezoid beam profile and the evaluation device may be configured for determine an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device may be configured for determine one or both of center information or edge information from at least one slice or cut of the light spot. This may be realized, for example, by replacing the area integrals in the combined signal Q by a line integral along the slice or cut. For improved accuracy, several slices or cuts through the light spot may be used and averaged. In case of an elliptical spot profile, averaging over several slices or cuts may result in improved distance information.

In one embodiment, the light beam propagating from the object to the detector may illuminate the sensor element with at least one pattern comprising at least one feature point. As used herein, the term "feature point" refers to at least one at least partially extended feature of the pattern. The feature point may be selected from the group consisting of: at least one point, at least one line, at least one edge. The pattern may be generated by the object, for example, in response to an illumination by the at least one light source with an illumination pattern comprising the at least one pattern. A1 may correspond to a full or complete area of a feature point on the optical sensors. A2 may be a central area of the feature point on the optical sensors. The central area may be a constant value. The central area may be smaller compared to the full area of the feature point. For example, in case of a circular feature point, the central area may have a radius from 0.1 to 0.9 of a full radius of the feature point, preferably from 0.4 to 0.6 of the full radius.

For example, the light beam propagating from the object to the detector may illuminate the optical sensors with at least one line pattern. The line pattern may be generated by the object, for example in response to an illumination by the at least one illumination source with an illumination pattern comprising the at least one line pattern. A1 may correspond to an area with a full line width of the line pattern on the optical sensors, in particular on the light sensitive area of the optical sensors. The line pattern on the optical sensors may be widened and/or displaced compared to the line pattern of the illumination pattern such that the line width on the optical sensors is increased. In particular, in case of a matrix of optical sensors, the line width of the line pattern on the optical sensors may change from one column to another column. A2 may be a central area of the line pattern on the optical sensors. The line width of the central area may be a constant value, and may in particular correspond to the line width in the illumination pattern. The central area may have a smaller line width compared to the full line width. For example, the central area may have a line width from 0.1 to 0.9 of the full line width, preferably from 0.4 to 0.6 of the full line width. The line pattern may be segmented on the optical sensors. Each column of the matrix of optical sensors may comprise center information of intensity in the central area of the line pattern and edge information of intensity from regions extending further outwards from the central area to edge regions of the line pattern.

For example, the light beam propagating from the object to the detector may illuminate the sensor element with at least one point pattern. The point pattern may be generated by the object, for example in response to an illumination by the at least one light source with an illumination pattern comprising the at least one point pattern. A1 may correspond to an area with a full radius of a point of the point pattern on the optical sensors. A2 may be a central area of the point in the point pattern on the optical sensors. The central area may be a constant value. The central area may have a radius compared to the full radius. For example, the central area may have a radius from 0.1 to 0.9 of the full radius, preferably from 0.4 to 0.6 of the full radius.

The light beam propagating from the object to the detector may illuminate the sensor element with a reflection pattern comprising both point patterns and line patterns. Other embodiments in addition or alternatively to line pattern and point pattern are feasible.

The evaluation device may be configured to derive the combined signal Q by one or more of dividing the edge information and the center information, dividing multiples of the edge information and the center information, dividing linear combinations of the edge information and the center information. Thus, essentially, photon ratios may be used as the physical basis of the method.

For example, the evaluation device may be configured for evaluating the sensor signals, by
 a) determining at least one optical sensor having the highest sensor signal and forming at least one center signal;
 b) evaluating the sensor signals of the optical sensors of the matrix and forming at least one sum signal;
 c) determining at least one combined signal by combining the center signal and the sum signal; and
 d) determining the at least one longitudinal coordinate z of the selected feature by evaluating the combined signal.

As explained, e.g. in WO 2012/110924 A1 or WO 2014/097181 A1, typically, a predetermined or determinable relationship exists between a size of a light spot, such as a diameter of the light spot, a beam waist or an equivalent diameter, and the longitudinal coordinate of the object from which the light beam propagates towards the detector. Without wishing to be bound by this theory, the light spot may be characterized by two measurement variables: a measurement signal measured in a small measurement patch in the center or close to the center of the light spot, also referred to as the center signal, and an integral or sum signal integrated over the light spot, with or without the center signal. For a light beam having a certain total power which does not change when the beam is widened or focused, the sum signal should be independent from the spot size of the light spot, and, thus, should, at least when linear optical sensors within their respective measurement range are used, be independent from the distance between the object and the detector. The center signal, however, is dependent on the spot size. Thus, the center signal typically increases when the light beam is focused, and decreases when the light beam is defocused. By comparing the center signal and the sum signal, thus, an item of information on the size of the light spot generated by the light beam and, thus, on the longitudinal coordinate of the object may be generated. The comparing of the center signal and the sum signal, as an example, may be done by forming the combined signal Q out of the center signal and the sum signal and by using a predetermined or determinable relationship between the longitudinal coordinate and the quotient signal for deriving the longitudinal coordinate.

The use of a matrix of optical sensors provides a plurality of advantages and benefits. Thus, the center of the light spot generated by the light beam on the sensor element, such as on the common plane of the light-sensitive areas of the optical sensors of the matrix of the sensor element, may vary with a transversal position of the object. By using a matrix of optical sensors, the detector according to the present invention may adapt to these changes in conditions and, thus, may determine the center of the light spot simply by comparing the sensor signals. Consequently, the detector according to the present invention may, by itself, choose the center signal and determine the sum signal and, from these two signals, derive a combined signal which contains information on the longitudinal coordinate of the object. By evaluating the combined signal, the longitudinal coordinate of the object may, thus, be determined. The use of the matrix of optical sensors, thus, provides a significant flexibility in terms of the position of the object, specifically in terms of a transversal position of the object.

The transversal position of the light spot on the matrix of optical sensors, such as the transversal position of the at least one optical sensor generating the sensor signal, may even be used as an additional item of information, from which at least one item of information on a transversal position of the object may be derived, as e.g. disclosed in WO 2014/198629 A1. Additionally or alternatively, as will be outlined in further detail below, the detector according to the present invention may contain at least one additional transversal detector for, in addition to the at least one longitudinal coordinate, detecting at least one transversal coordinate of the object.

Consequently, in accordance with the present invention, the term "center signal" generally refers to the at least one sensor signal comprising essentially center information of the beam profile. For example, the center signal may be the signal of the at least one optical sensor having the highest sensor signal out of the plurality of sensor signals generated by the optical sensors of the entire matrix or of a region of interest within the matrix, wherein the region of interest may be predetermined or determinable within an image generated by the optical sensors of the matrix. As used herein, the term "highest sensor signal" refers to one or both of a local maximum or a maximum in a region of interest. The center signal may arise from a single optical sensor or, as will be outlined in further detail below, from a group of optical sensors, wherein, in the latter case, as an example, the sensor signals of the group of optical sensors may be added up, integrated or averaged, in order to determine the center signal. The group of optical sensors from which the center signal arises may be a group of neighboring optical sensors, such as optical sensors having less than a predetermined distance from the actual optical sensor having the highest sensor signal, or may be a group of optical sensors generating sensor signals being within a predetermined range from the highest sensor signal. The group of optical sensors from which the center signal arises may be chosen as large as possible in order to allow maximum dynamic range. The evaluation device may be configured for determine the center signal by integration of the plurality of sensor signals, for example the plurality of optical sensors around the optical sensor having the highest sensor signal. For example, the beam profile may be a trapezoid beam profile and the evaluation device may be configured for determine an integral of the trapezoid, in particular of a plateau of the trapezoid.

As outlined above, the center signal generally may be a single sensor signal, such as a sensor signal from the optical sensor in the center of the light spot, or may be a combination of a plurality of sensor signals, such as a combination of sensor signals arising from optical sensors in the center of the light spot, or a secondary sensor signal derived by processing a sensor signal derived by one or more of the aforementioned possibilities. The determination of the center signal may be performed electronically, since a comparison of sensor signals is fairly simply implemented by conventional electronics, or may be performed fully or partially by software. Specifically, the center signal may be selected from the group consisting of: the highest sensor signal; an average of a group of sensor signals being within a predetermined range of tolerance from the highest sensor signal; an average of sensor signals from a group of optical sensors containing the optical sensor having the highest sensor signal and a predetermined group of neighboring optical sensors; a sum of sensor signals from a group of optical sensors containing the optical sensor having the highest sensor signal and a predetermined group of neighboring optical sensors; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring optical sensors; an integral of a group of sensor signals being within a predetermined range of tolerance from the highest sensor signal; an integral of a group of sensor signals being above a predetermined threshold.

Similarly, the term "sum signal" generally refers to a signal comprising essentially edge information of the beam profile. For example, the sum signal may be derived by adding up the sensor signals, integrating over the sensor signals or averaging over the sensor signals of the entire matrix or of a region of interest within the matrix, wherein the region of interest may be predetermined or determinable within an image generated by the optical sensors of the matrix. When adding up, integrating over or averaging over the sensor signals, the actual optical sensors from which the sensor signal is generated may be left out of the adding, integration or averaging or, alternatively, may be included into the adding, integration or averaging. The evaluation device may be configured for determine the sum signal by integrating signals of the entire matrix, or of the region of interest within the matrix. For example, the beam profile may be a trapezoid beam profile and the evaluation device may be configured for determine an integral of the entire trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Similarly, the center signal and edge signal may also be determined by using segments of the beam profile such as circular segments of the beam profile. For example, the beam profile may be divided into two segments by a secant or a chord that does not pass the center of the beam profile. Thus, one segment will essentially contain edge information, while the other segment will contain essentially center information. For example, to further reduce the amount of edge information in the center signal, the edge signal may further be subtracted from the center signal.

Additionally or alternatively, the evaluation device may be configured for determine one or both of center information or edge information from at least one slice or cut of the light spot. This may be realized for example by replacing the area integrals in the combined signal Q by a line integral along the slice or cut. For improved accuracy, several slices or cuts through the light spot may be used and averaged. In case of an elliptical spot profile, averaging over several slices or cuts may result in an improved distance information.

The combined signal may be a signal which is generated by combining the center signal and the sum signal. Specifically, the combination may include one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa. Additionally or alternatively, the combined signal may comprise an arbitrary signal or signal combination which contains at least one item of information on a comparison between the center signal and the sum signal.

The evaluation device may be configured to determine the at least one longitudinal coordinate z of the object by using at least one known, determinable or predetermined relationship between the sensor signals. In particular, the evaluation device is configured to determine the at least one coordinate z of the object by using at least one known, determinable or predetermined relationship between a quotient signal derived from the sensor signals and the longitudinal coordinate.

Raw sensor signals of the optical sensors may be used for evaluation or secondary sensor signals derived thereof. As used herein, the term "secondary sensor signal" generally refers to a signal, such as an electronic signal, more preferably an analogue and/or a digital signal, which is obtained by processing one or more raw signals, such as by filtering, averaging, demodulating or the like. Thus, image processing algorithms may be used for generating secondary sensor signals from the totality of sensor signals of the matrix or from a region of interest within the matrix. Specifically, the detector, such as the evaluation device, may be configured for transforming the sensor signals of the optical sensor, thereby generating secondary optical sensor signals, wherein the evaluation device is configured for performing steps a)-d) by using the secondary optical sensor signals. The transformation of the sensor signals specifically may comprise at least one transformation selected from the group consisting of: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing an object within an image generated by the optical sensors. As an example, a vehicle, a person or another type of predetermined object may be determined by automatic image recognition within an image, i.e. within the totality of sensor signals generated by the optical sensors, and the region of interest may be chosen such that the object is located within the region of interest. In this case, the evaluation, such as the determination of the longitudinal coordinate, may be performed for the region of interest, only. Other implementations, however, are feasible.

As outlined above, the detection of the center of the light spot, i.e. the detection of the center signal and/or of the at least one optical sensor from which the center signal arises, may be performed fully or partially electronically or fully or partially by using one or more software algorithms. Specifically, the evaluation device may comprise at least one center detector for detecting the at least one highest sensor signal and/or for forming the center signal. The center detector specifically may fully or partially be embodied in software and/or may fully or partially be embodied in hardware. The center detector may fully or partially be integrated into the at least one sensor element and/or may fully or partially be embodied independently from the sensor element.

As outlined above, the sum signal may be derived from all sensor signals of the matrix, from the sensor signals within a region of interest or from one of these possibilities with the sensor signals arising from the optical sensors contributing to the center signal excluded. In every case, a reliable sum signal may be generated which may be compared with the center signal reliably, in order to determine the longitudinal coordinate. Generally, the sum signal may be selected from the group consisting of: an average over all sensor signals of the matrix; a sum of all sensor signals of the matrix; an integral of all sensor signals of the matrix; an average over all sensor signals of the matrix except for sensor signals from those optical sensors contributing to the center signal;

a sum of all sensor signals of the matrix except for sensor signals from those optical sensors contributing to the center signal; an integral of all sensor signals of the matrix except for sensor signals from those optical sensors contributing to the center signal; a sum of sensor signals of optical sensors within a predetermined range from the optical sensor having the highest sensor signal; an integral of sensor signals of optical sensors within a predetermined range from the optical sensor having the highest sensor signal; a sum of sensor signals above a certain threshold of optical sensors being located within a predetermined range from the optical sensor having the highest sensor signal; an integral of sensor signals above a certain threshold of optical sensors being located within a predetermined range from the optical sensor having the highest sensor signal. Other options, however, exist.

The summing may be performed fully or partially in software and/or may be performed fully or partially in hardware. A summing is generally possible by purely electronic means which, typically, may easily be implemented into the detector. Thus, in the art of electronics, summing devices are generally known for summing two or more electrical signals, both analogue signals and digital signals. Thus, the evaluation device may comprise at least one summing device for forming the sum signal. The summing device may fully or partially be integrated into the sensor element or may fully or partially be embodied independently from the sensor element. The summing device may fully or partially be embodied in one or both of hardware or software.

As outlined above, the comparison between the center signal and the sum signal specifically may be performed by forming one or more quotient signals. Thus, generally, the combined signal may be a quotient signal Q, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa; forming a quotient of the center signal and a linear combination of the sum signal and the center signal or vice versa; forming a quotient of the sum signal and a linear combination of the sum signal and the center signal or vice versa; forming a quotient of an exponentiation of the center signal and an exponentiation of the sum signal or vice versa. Other options, however, exist. The evaluation device may be configured for forming the one or more quotient signals. The evaluation device may further be configured for determining the at least one longitudinal coordinate by evaluating the at least one quotient signal.

The evaluation device specifically may be configured for using at least one predetermined relationship between the combined signal Q and the longitudinal coordinate, in order to determine the at least one longitudinal coordinate. Thus, due to the reasons disclosed above and due to the dependency of the properties of the light spot on the longitudinal coordinate, the combined signal Q typically is a monotonous function of the longitudinal coordinate of the object and/or of the size of the light spot such as the diameter or equivalent diameter of the light spot. Thus, as an example, specifically in case linear optical sensors are used, a simple quotient of the sensor signal $s_{center}$ and the sum signal $s_{sum}$ $Q=s_{center}/s_{sum}$ may be a monotonously decreasing function of the distance. Without wishing to be bound by this theory, it is believed that this is due to the fact that, in the preferred setup described above, both the center signal $s_{center}$ and the sum signal $s_{sum}$ decrease as a square function with increasing distance to the light source, since the amount of light reaching the detector decreases. Therein, however, the center signal $s_{center}$ decreases more rapidly than the sum signal $s_{sum}$, since, in the optical setup as used in the experiments, the light spot in the image plane grows and, thus, is spread over a larger area. The quotient of the center signal and the sum signal, thus, continuously decreases with increasing diameter of the light beam or diameter of the light spot on the light-sensitive areas of the optical sensors of the matrix. The quotient, further, is typically independent from the total power of the light beam, since the total power of the light beam forms a factor both in the center signal and in the sum sensor signal. Consequently, the combined signal Q may form a secondary signal which provides a unique and unambiguous relationship between the center signal and the sum signal and the size or diameter of the light beam. Since, on the other hand, the size or diameter of the light beam is dependent on a distance between the object, from which the light beam propagates towards the detector, and the detector itself, i.e. dependent on the longitudinal coordinate of the object, a unique and unambiguous relationship between the center signal and the sum signal on the one hand and the longitudinal coordinate on the other hand may exist. For the latter, reference e.g. may be made to one or more of the above-mentioned prior art documents, such as WO 2014/097181 A1. The predetermined relationship may be determined by analytical considerations, such as by assuming a linear combination of Gaussian light beams, by empirical measurements, such as measurements measuring the combined signal and/or the center signal and the sum signal or secondary signals derived thereof as a function of the longitudinal coordinate of the object, or both.

Thus, generally, the evaluation device may be configured for determining the longitudinal coordinate by evaluating the combined signal Q. This determining may be a one-step process, such as by directly combining the center signal and the sum signal and deriving the longitudinal coordinate thereof, or may be a multiple step process, such as by firstly deriving the combined signal from the center signal and the sum signal and, secondly, by deriving the longitudinal coordinate from the combined signal. Both options, i.e. the option of steps c) and d) being separate and independent steps and the option of steps c) and d) being fully or partially combined, shall be comprised by the present invention.

The evaluation device may be configured for using at least one predetermined relationship between the combined signal and the longitudinal coordinate. The predetermined relationship may be one or more of an empiric relationship, a semi-empiric relationship and an analytically derived relationship. The evaluation device may comprise at least one data storage device for storing the predetermined relationship, such as a lookup list or a lookup table.

The combined signal Q may be determined by using various means. As an example, a software means for deriving the quotient signal, a hardware means for deriving the quotient signal, or both, may be used and may be implemented in the evaluation device. Thus, the evaluation device, as an example, may comprise at least one divider, wherein the divider is configured for deriving the quotient signal. The divider may fully or partially be embodied as one or both of a software divider or a hardware divider. The divider may fully or partially be integrated into the sensor element answers or may fully or partially be embodied independent from the sensor element.

The detector may comprise at least one optical element selected from the group consisting of: transfer device, such as at least one lens and/or at least one lens system, at least one diffractive optical element. The term "transfer device", also denoted as "transfer system", may generally refer to one or more optical elements which are configured for modify the light beam, such as by modifying one or more of a beam parameter of the light beam, a width of the light beam or a direction of the light beam. The transfer device may be configured for guide the light beam onto the optical sensors. The transfer device specifically may comprise one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system. As used herein, the term "focal length" of the transfer device refers to a distance over which incident collimated rays which may impinge the transfer device are brought into a "focus" which may also be denoted as "focal point". Thus, the focal length constitutes a measure of an ability of the transfer device to converge an impinging light beam. Thus, the transfer device may comprise one or more imaging elements which can have the effect of a converging lens. By way of example, the transfer device can have one or more lenses, in particular one or more refractive lenses, and/or one or more convex mirrors. In this example, the focal length may be defined as a distance from the center of the thin refractive lens to the principal focal points of the thin lens. For a converging thin refractive lens, such as a convex or biconvex thin lens, the focal length may be considered as being positive and may provide the distance at which a beam of collimated light impinging the thin lens as the transfer device may be focused into a single spot. Additionally, the transfer device can comprise at least one wavelength-selective element, for example at least one optical filter. Additionally, the transfer device can be designed to impress a predefined beam profile on the electromagnetic radiation, for example, at the location of the sensor region and in particular the sensor area. The abovementioned optional embodiments of the transfer device can, in principle, be realized individually or in any desired combination.

The transfer device may have an optical axis. In particular, the detector and the transfer device have a common optical axis. As used herein, the term "optical axis of the transfer device" generally refers to an axis of mirror symmetry or rotational symmetry of the lens or lens system. The optical axis of the detector may be a line of symmetry of the optical setup of the detector. The detector comprises at least one transfer device, preferably at least one transfer system having at least one lens. The transfer system, as an example, may comprise at least one beam path, with the elements of the transfer system in the beam path being located in a rotationally symmetrical fashion with respect to the optical axis. Still, as will also be outlined in further detail below, one or more optical elements located within the beam path may also be off-centered or tilted with respect to the optical axis. In this case, however, the optical axis may be defined sequentially, such as by interconnecting the centers of the optical elements in the beam path, e.g. by interconnecting the centers of the lenses, wherein, in this context, the optical sensors are not counted as optical elements. The optical axis generally may denote the beam path. Therein, the detector may have a single beam path along which a light beam may travel from the object to the optical sensors, or may have a plurality of beam paths. As an example, a single beam path may be given or the beam path may be split into two or more partial beam paths. In the latter case, each partial beam path may have its own optical axis. The optical sensors may be located in one and the same beam path or partial beam path. Alternatively, however, the optical sensors may also be located in different partial beam paths.

The transfer device may constitute a coordinate system, wherein a longitudinal coordinate I is a coordinate along the optical axis and wherein d is a spatial offset from the optical axis. The coordinate system may be a polar coordinate system in which the optical axis of the transfer device forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate z. Any direction perpendicular to the z-axis may be considered a transversal direction, and the polar coordinate and/or the polar angle may be considered a transversal coordinate.

As further used herein, the term "evaluation device" generally refers to an arbitrary device configured for perform the named operations, preferably by using at least one data processing device and, more preferably, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the named operations.

The above-mentioned operations, including determining the at least one longitudinal coordinate of the object, are performed by the at least one evaluation device. Thus, as an example, one or more of the above-mentioned relationships may be implemented in software and/or hardware, such as by implementing one or more lookup tables. Thus, as an example, the evaluation device may comprise one or more programmable devices such as one or more computers, application-specific integrated circuits (ASICs), Digital Signal Processors (DSPs), or Field Programmable Gate Arrays (FPGAs) which are configured to perform the above-mentioned evaluation, in order to determine the at least one longitudinal coordinate of the object. Additionally or alternatively, however, the evaluation device may also fully or partially be embodied by hardware.

As outlined above, by evaluating the center signal and the sum signal, the detector may be enabled to determine the at least one longitudinal coordinate of the object, including the option of determining the longitudinal coordinate of the whole object or of one or more parts thereof. In addition, however, other coordinates of the object, including one or more transversal coordinates and/or rotational coordinates, may be determined by the detector, specifically by the evaluation device. Thus, as an example, one or more transversal sensors may be used for determining at least one transversal coordinate of the object. As outlined above, the position of the at least one optical sensor from which the center signal arises may provide information on the at least one transversal coordinate of the object, wherein, as an example, a simple lens equation may be used for optical transformation and for deriving the transversal coordinate. Additionally or alternatively, one or more additional transversal sensors may be used and may be comprised by the detector. Various transversal sensors are generally known in the art, such as the transversal sensors disclosed in WO 2014/097181 A1 and/or other position-sensitive devices (PSDs), such as quadrant diodes, CCD or CMOS chips or the like. Additionally or alternatively, as an example, the detector according to the present invention may comprise one or more PSDs disclosed in R. A. Street (Ed.): *Technology and Applications of Amorphous Silicon*, Springer-Verlag Heidelberg, 2010, pp. 346-349. Other embodiments are feasible. These devices may generally also be implemented into the detector according to the present invention. As an example, a part of the light beam may be split off within the detector, by at least one beam splitting element. The split-off portion, as an example, may be guided towards a transversal sensor, such as a CCD or CMOS chip or a camera sensor, and a transversal position of a light spot generated by the split-off portion on the transversal sensor may be determined, thereby determining at least one transversal coordinate of the object. Consequently, the detector according to the present invention may either be a one-dimensional detector, such as a simple distance measurement device, or may be embodied as a two-dimensional detector or even as a three-dimensional detector. Further, as outlined above or as outlined in further detail below, by scanning a scenery or an environment in a one-dimensional fashion, a three-dimensional image may also be created. Consequently, the detector according to the present invention specifically may be one of a one-dimensional detector, a two-dimensional detector or a three-dimensional detector. The evaluation device may further be configured to determine at least one transversal coordinate x, y of the object. The evaluation device may be configured for combine the information of the longitudinal coordinate and the transversal coordinate and to determine a position of the object in space.

The evaluation device may be configured to determine a longitudinal region of the selected reflection feature by evaluating the combined signal Q, wherein the longitudinal region is given by the longitudinal coordinate z and an error interval $\pm\varepsilon$. As used herein, the term "longitudinal region" refers to at least one uncertainty interval defined by the longitudinal coordinate z and the measurement uncertainty $\pm\varepsilon$ of the determination of the longitudinal coordinate from the combined signal Q. Error E may depend on measurement uncertainty of the optical sensor. The measurement uncertainty of the optical sensors may be pre-determined and/or estimated and/or may be deposited in at least one data storage unit of the evaluation device. For example, the error interval may be $\pm 10\%$, preferably $\pm 5\%$, more preferably $\pm 1\%$.

The evaluation device may be configured to determine at least one displacement region in at least one reference image corresponding to the longitudinal region. As used herein, the term "reference image" refers to an image different from the reflection image which is determined at a different spatial position compared to the reflection image. The reference image may be determined by one or more of recording at least one reference feature, imaging the at least one reference feature, calculating of the reference image. The reference image and the reflection image may be images of the object determined at different spatial positions having a fixed distance. The distance may be a relative distance, also called baseline. The evaluation device may be configured for determine the at least one reference feature in the at least one reference image corresponding to the at least one reflection feature. As outlined above, the evaluation device may be configured for perform an image analysis and to identify features of the reflection image. The evaluation device may be configured for identify at least one reference feature in the reference image having an essentially identical longitudinal coordinate as the selected reflection feature. The term "essentially identical" refers to identical within 10%, preferably 5%, most preferably 1%. The reference feature corresponding to the reflection feature may be determined using epipolar geometry. For description of epipolar geometry reference is made, for example, to chapter 2 in X. Jiang, H. Bunke: "Dreidimensionales Computersehen", Springer, Berlin Heidelberg, 1997. Epipolar geometry may assume that the reference image and the reflection image may be images of the object determined at different spatial positions and/or spatial orientations having a fixed distance. The reference image and the reflection image may be images of the object determined at different spatial positions having a fixed distance. The evaluation device may be configured for determine an epipolar line in the reference image. Relative position of the reference image and reflection image may be known. For example, relative position of the reference image and reflection image may be stored within at least one storage unit of the evaluation device. The evaluation device may be configured for determine a straight line extending from the selected reflection feature of the reflection image. The straight line may comprise possible object features corresponding to the selected feature. The straight line and the baseline span an epipolar plane. As the reference image is determined at a different relative position from the reflection image, the corresponding possible object features may be imaged on a straight line, called epipolar line, in the reference image. Thus, a feature of the reference image corresponding to the selected feature of the reflection image lies on the epipolar line. Due to distortions of the image or changes in the system parameters such as due to ageing, temperature changes, mechanical stress or the like, epipolar lines may intersect or be very close to each other and/or the correspondence between reference feature and reflection feature may be unclear. Further, each known position or object in the real world may be projected onto the reference image and vice versa. The projection may be known due to a calibration of the detector, whereas the calibration is comparable to a teach-in of the epipolar geometry of the specific camera.

As used herein, the term "displacement region" refers to a region in the reference image in which the reference feature corresponding to the selected reflection feature may be imaged. Specifically, the displacement region may be a region in the reference image in which the reference feature corresponding to the selected reflection feature is expected to be located in the reference image. Depending on the distance to the object, an image position of the reference feature corresponding to the reflection feature may be displaced within the reference image compared to an image position of the reflection feature in the reflection image. The displacement region may comprise only one reference feature. The displacement region may also comprise more than one reference feature. The displacement region may comprise an epipolar line or a section of an epipolar line. The displacement region may comprise more than one epipolar line or more sections of more than one epipolar line. As used herein, the term "reference feature" refers to at least one feature of the reference image. The displacement region may extend along the epipolar line, orthogonal to an epipolar line, or both. The evaluation device may be configured for determine the reference feature along the epipolar line corresponding to the longitudinal coordinate z and to determine an extent of the displacement region along the epipolar line corresponding to the error interval $\pm\varepsilon$ or orthogonal to an epipolar line. The measurement uncertainty of the distance measurement using the combined signal Q may result in a displacement region which is non-circular since the measurement uncertainty may be different for different directions. Specifically, the measurement uncertainty along the epipolar line or epipolar lines may be greater than the measurement uncertainty in an orthogonal direction with respect to the epipolar line or epipolar lines. The displacement region may comprise an extent in an orthogonal direction with respect to the epipolar line or epipolar lines. The evaluation device may determine a displacement region around the image position of the reflection feature. The evaluation device may be configured for determine the longitudinal coordinate z for the reflection feature and an error interval ±ε from the combined signal Q to determine the displacement region along the epipolar line corresponding to z±ε. The evaluation device may be configured for match the selected reflection feature with at least one reference feature within the displacement region. As used herein, the term "matching" refers to determining and/or evaluating corresponding reference and reflection features. The evaluation device may be configured for match the selected feature of the reflection image with the reference feature within the displacement region by using at least one evaluation algorithm considering the determined longitudinal coordinate z. The evaluation algorithm may be a linear scaling algorithm. The evaluation device may be configured for determine the epipolar line closest to and/or within the displacement region. The evaluation device may be configured for determine the epipolar line closest to the image position of the reflection feature. The extent of the displacement region along the epipolar line may be larger than the extent of the displacement region orthogonal to the epipolar line. The evaluation device may be configured for determine an epipolar line before determining a corresponding reference feature. The evaluation device may determine a displacement region around the image position of each reflection feature. The evaluation device may be configured for assign an epipolar line to each displacement region of each image position of the reflection features, such as by assigning the epipolar line closest to a displacement region and/or within a displacement region and/or closest to a displacement region along a direction orthogonal to the epipolar line. The evaluation device may be configured for determine the reference feature corresponding to the image position of the reflection feature by determining the reference feature closest to the assigned displacement region and/or within the assigned displacement region and/or closest to the assigned displacement region along the assigned epipolar line and/or within the assigned displacement region along the assigned epipolar line.

Additionally or alternatively, the evaluation device may be configured to perform the following steps:

Determining the displacement region for the image position of each reflection feature;

Assigning an epipolar line to the displacement region of each reflection feature such as by assigning the epipolar line closest to a displacement region and/or within a displacement region and/or closest to a displacement region along a direction orthogonal to the epipolar line;

Assigning and/or determining at least one reference feature to each reflection feature such as by assigning the reference feature closest to the assigned displacement region and/or within the assigned displacement region and/or closest to the assigned displacement region along the assigned epipolar line and/or within the assigned displacement region along the assigned epipolar line.

Additionally or alternatively, the evaluation device may be configured for decide between more than one epipolar line and/or reference feature to be assigned to a reflection feature such as by comparing distances of reflection features and/or epipolar lines within the reference image and/or by comparing error weighted distances, such as e-weighted distances of reflection features and/or epipolar lines within the reference image and assigning the epipolar line and/or reference feature in shorter distance and/or e-weighted distance to the reference feature and/or reflection feature.

Preferably, the detector may be configured for pre-classify the selected reflection feature using the combined signal Q such that an unambiguous assignment to one reference feature is possible. In particular, illumination features of the illumination pattern may be arranged such that corresponding reference features of the reference image may have a relative distance to each other as large as possible on the epipolar line. The illumination features of the illumination pattern may be arranged such that only few reference features are positioned on the epipolar line. For example, the illumination pattern may comprise at least one hexagonal pattern. Preferably, the illumination pattern may comprise at least one hexagonal pattern, wherein the pattern is rotated relative to the baseline. Preferably, the illumination pattern may comprise at least one displaced hexagonal pattern, wherein individual points of the hexagonal pattern are displaced by a random distance from the regular position, for example orthogonal to the epipolar line of the point. The displacement of the individual points may be smaller than half of the distance between two parallel epipolar lines, preferably smaller than one fourth of the distance between two parallel epipolar lines. The displacement of the individual points may be as such that two points are not displaced above each other.

The evaluation device may be configured for determine a displacement of the matched reference feature and the selected reflection feature. As used herein, the term "displacement" refers to difference between a position in the reference image to a position in the reflection image. The evaluation device may be configured for determine a longitudinal information of the matched feature using a predetermined relationship between a longitudinal coordinate and the displacement. As used herein, the term "longitudinal information" refers to information relating to the longitudinal coordinate. For example, the longitudinal information may be a distance value. The evaluation device may be configured for determine the pre-determined relationship by using triangulation methods. In case position of the selected reflection feature in the reflection image and position of the matched reference feature and/or relative displacement of the selected reflection feature and the matched reference feature are known, longitudinal coordinate of the corresponding object feature may be determined by triangulation. Thus, the evaluation device may be configured for select, for example subsequent and/or column by column, a reflection feature and to determine for each potential position of the reference feature the corresponding distance value using triangulation. Displacement and corresponding distance value may be stored in at least one storage device of the evaluation device. The evaluation device may, as an example, comprise at least one data processing device, such as at least one processor, at least one DSP, at least one FPGA and/or at least one ASIC. Further, for storing the at least one predetermined or determinable relationship between the longitudinal coordinate z and the displacement, the at least one data storage device may be provided, such as for providing one or more look-up tables for storing the predetermined relationship. The evaluation device may be configured for store parameters for an intrinsic and/or extrinsic calibration of the camera and/or the detector. The evaluation device may be configured for generate the parameters for an intrinsic and/or extrinsic calibration of the camera and/or the detector such as by performing a Tsai camera calibration. The evaluation device may be configured for compute and/or estimate parameters such as the focal length of the transfer device, the radial lens distortion coefficient, the coordinates of the center of radial lens distortion, scale factors to account for any uncertainty due to imperfections in hardware timing for scanning and digitization, rotation angles for the transformation between the world and camera coordinates, translation components for the transformation between the world and camera coordinates, aperture angles, image sensor format, principal point, skew coefficients, camera center, camera heading, baseline, rotation or translation parameters between camera and/or illumination source, apertures, focal distance, or the like.

Using the combined sensor signal allows to estimate distances, such as the longitudinal coordinate z within the error interval. By determining the displacement region corresponding to the estimated longitudinal coordinate and the corresponding error interval allows to reduce the possible number of solutions along the epipolar line significantly. The number of possible solutions may even be reduced to one. Determining of the longitudinal coordinate z and the error interval may be performed during a pre-evaluation before matching the selected reflection feature and reference feature. This may allow reducing the computational demand such that it is possible to significantly reduce costs and to allow a use in mobile device or outdoor devices. Furthermore, generally in triangulation systems the baseline has to be large in order to detect large distances. Pre-evaluation of the longitudinal coordinate z and error interval using the combined sensor signal and subsequent matching of the selected reflection feature and reference feature may allow using short baselines such that it may be possible to provide a compact device. Furthermore, pre-evaluation of the longitudinal coordinate z and error interval using the combined sensor signal and subsequent matching of the selected reflection feature and reference feature may enhance accuracy and/or speed and/or may lower computational demand in comparison to conventional triangulation systems. Further, the number of illumination features such as the number of illumination points in the illumination pattern may be reduced to increase the light intensity in each illumination point such as to compete with ambient light while complying to eye safety regulations. A reduced number of illumination features in a conventional triangulation system might increase the difficulty to match reflection features and reference features. Further, the number of illumination features such as the number of illumination points in the illumination pattern may be increased, such as to increase the resolution of the distance measurement, such as to increase the resolution of the obtained depth map without increasing the processing power of the evaluation device such as in a mobile application.

The sensor element may be configured for determine at least one reflection pattern. As used herein, the term "reflection pattern" refers to a response pattern generated by reflection or scattering of light at the surface of the object, in particular generated by the object in response to illumination by the illumination pattern. As outlined above, the illumination pattern comprises at least one feature configured for illuminate the object. The reflection pattern may comprise at least one feature corresponding to at least one feature of the illumination pattern. The reflection pattern may comprise, in comparison to the illumination pattern, at least one distorted pattern, wherein the distortion depends on the distance of the object, such as surface properties of the object. The evaluation device may be configured for select at least one feature of the reflection pattern and to determine the longitudinal region of the selected feature of the reflection pattern by evaluating the combined signal Q from the sensor signals, as described above.

For example, the reference image may be an image of the illumination pattern at an image plane at a position of the projector. The evaluation device may be configured for determine the displacement region in the reference image corresponding to the longitudinal region of the selected feature of the reflection pattern. The evaluation device may be configured for match the selected feature of the reflection pattern with at least one feature of the reference pattern within the displacement region. The projector and the sensor element may be separated by a fixed distance.

For example, the detector may comprise at least two sensor elements each having a matrix of optical sensors. At least one first sensor element and at least one second sensor element may be positioned at different spatial positions. A relative distance between the first sensor element and the second element may be fixed. The at least one first sensor element may be configured for determine at least one first reflection pattern, in particular at least one first reflection feature, and the at least one second sensor element may be configured for determine at least one second reflection pattern, in particular at least one second reflection feature. The evaluation device may be configured for select at least one image determined by the first sensor element or the second sensor element as reflection image and to select at least one image determined by the other one of the first sensor element or the second sensor element as reference image. The evaluation device may be configured for select the at least one reflection feature in the reflection pattern and to determine the longitudinal region of the selected feature by evaluating the combined signal Q from the sensor signals. The evaluation device may be configured for determine the displacement region in the reference image corresponding to the longitudinal region of the selected feature of the reflection pattern. The evaluation device may be configured for match the selected feature of the reflection pattern with at least one feature of the reference pattern within the displacement region.

As outlined above, the detector may further comprise one or more additional elements such as one or more additional optical elements. Further, the detector may fully or partially be integrated into at least one housing.

In a further aspect of the present invention, a detector system for determining a position of at least one object is disclosed. The detector system comprises at least one detector according to the present invention, such as according to one or more of the embodiments disclosed above or according to one or more of the embodiments disclosed in further detail below. The detector system further comprises at least one beacon device configured for direct at least one light beam towards the detector, wherein the beacon device is at least one of attachable to the object, holdable by the object and integratable into the object. Further details regarding the beacon device will be given below, including potential embodiments thereof. Thus, the at least one beacon device may be or may comprise at least one active beacon device, comprising one or more illumination sources such as one or more light sources like lasers, LEDs, light bulbs or the like. As an example, the light emitted by the illumination source may have a wavelength of 300-500 nm. Alternatively, as outlined above, the infrared spectral range may be used, such as in the range of 780 nm to 3.0 µm. Specifically, the near infrared region where silicon photodiodes are applicable specifically in the range of 700 nm to 1000 nm may be used. The light emitted by the one or more beacon devices may be non-modulated or may be modulated, as outlined above, in order to distinguish two or more light beams. Additionally or alternatively, the at least one beacon device may be configured for reflect one or more light beams towards the detector, such as by comprising one or more reflective elements. Further, the at least one beacon device may be or may comprise one or more scattering elements configured for scattering a light beam. Therein, elastic or inelastic scattering may be used. In case the at least one beacon device is configured for reflect and/or scatter a primary light beam towards the detector, the beacon device may be configured for leave the spectral properties of the light beam unaffected or, alternatively, may be configured for change the spectral properties of the light beam, such as by modifying a wavelength of the light beam.

In a further aspect of the present invention, a human-machine interface for exchanging at least one item of information between a user and a machine is disclosed. The human-machine interface comprises at least one detector system according to the embodiments disclosed above and/or according to one or more of the embodiments disclosed in further detail below. Therein, the at least one beacon device is configured for be at least one of directly or indirectly attached to the user or held by the user. The human-machine interface is designed to determine at least one position of the user by means of the detector system, wherein the human-machine interface is designed to assign to the position at least one item of information.

In a further aspect of the present invention, an entertainment device for carrying out at least one entertainment function is disclosed. The entertainment device comprises at least one human-machine interface according to the embodiment disclosed above and/or according to one or more of the embodiments disclosed in further detail below. The entertainment device is configured to enable at least one item of information to be input by a player by means of the human-machine interface. The entertainment device is further configured to vary the entertainment function in accordance with the information.

In a further aspect of the present invention, a tracking system for tracking a position of at least one movable object is disclosed. The tracking system comprises at least one detector system according to one or more of the embodiments referring to a detector system as disclosed above and/or as disclosed in further detail below. The tracking system further comprises at least one track controller. The track controller is configured to track a series of positions of the object at specific points in time.

In a further aspect of the present invention, a camera for imaging at least one object is disclosed. The camera comprises at least one detector according to any one of the embodiments referring to a detector as disclosed above or as disclosed in further detail below.

In a further aspect of the present invention, a scanning system for determining a depth profile of a scenery, which may also imply determining at least one position of at least one object, is provided. The scanning system comprises at least one detector according to the present invention, such as at least one detector as disclosed in one or more of the embodiments listed above and/or as disclosed in one or more of the embodiments below. The scanning system further comprises at least one illumination source configured to scan the scenery with at least one light beam, which may also be referred to as an illumination light beam or scanning light beam. As used herein, the term "scenery" generally refers to a two-dimensional or three-dimensional range which is visible by the detector, such that at least one geometric or spatial property of the two-dimensional or three-dimensional range may be evaluated with the detector. As further used herein, the term "scan" generally refers to a consecutive measurement in different regions. Thus, the scanning specifically may imply at least one first measurement with the illumination light beam being oriented or directed in a first fashion, and at least one second measurement with the illumination light beam being oriented or directed in a second fashion which is different from the first fashion. The scanning may be a continuous scanning or a stepwise scanning. Thus, in a continuous or stepwise fashion, the illumination light beam may be directed into different regions of the scenery, and the detector may be detected to generate at least one item of information, such as at least one longitudinal coordinate, for each region. As an example, for scanning an object, one or more illumination light beams may, continuously or in a stepwise fashion, create light spots on the surface of the object, wherein longitudinal coordinates are generated for the light spots. Alternatively, however, a light pattern may be used for scanning. The scanning may be a point scanning or a line scanning or even a scanning with more complex light patterns. The illumination source of the scanning system may be distinct from the projector of the detector. Alternatively, however, the illumination source of the scanning system may also be fully or partially identical with or integrated into the projector of the detector.

Thus, the scanning system may comprise at least one illumination source which is configured for emit the at least one light beam being configured for the illumination of the at least one dot located at the at least one surface of the at least one object. As used herein, the term "dot" refers to an area, specifically a small area, on a part of the surface of the object which may be selected, for example by a user of the scanning system, to be illuminated by the illumination source. Preferably, the dot may exhibit a size which may, on one hand, be as small as possible in order to allow the scanning system to determine a value for the distance between the illumination source comprised by the scanning system and the part of the surface of the object on which the dot may be located as exactly as possible and which, on the other hand, may be as large as possible in order to allow the user of the scanning system or the scanning system itself, in particular by an automatic procedure, to detect a presence of the dot on the related part of the surface of the object.

For this purpose, the illumination source may comprise an artificial illumination source, in particular at least one laser source and/or at least one incandescent lamp and/or at least one semiconductor light source, for example, at least one light-emitting diode, in particular an organic and/or inorganic light-emitting diode. As an example, the light emitted by the illumination source may have a wavelength of 300-500 nm. Additionally or alternatively, light in the infrared spectral range may be used, such as in the range of 780 nm to 3.0 µm. Specifically, the light in the part of the near infrared region where silicon photodiodes are applicable specifically in the range of 700 nm to 1000 nm may be used. On account of their generally defined beam profiles and other properties of handleability, the use of at least one laser source as the illumination source is particularly preferred. Herein, the use of a single laser source may be preferred, in particular in a case in which it may be important to provide a compact scanning system that might be easily storable and transportable by the user. The illumination source may, thus, preferably be a constituent part of the detector and may, therefore, in particular be integrated into the detector, such as into the housing of the detector. In a preferred embodiment, particularly the housing of the scanning system may comprise at least one display configured for providing distance-related information to the user, such as in an easy-to-read manner. In a further preferred embodiment, particularly the housing of the scanning system may, in addition, comprise at least one button which may be configured for operating at least one function related to the scanning system, such as for setting one or more operation modes. In a further preferred embodiment, particularly the housing of the scanning system may, in addition, comprise at least one fastening unit which may be configured for fastening the scanning system to a further surface, such as a rubber foot, a base plate or a wall holder, such as a base plate or holder comprising a magnetic material, in particular for increasing the accuracy of the distance measurement and/or the handleability of the scanning system by the user.

Particularly, the illumination source of the scanning system may, thus, emit a single laser beam which may be configured for the illumination of a single dot located at the surface of the object. By using at least one of the detectors according to the present invention at least one item of information about the distance between the at least one dot and the scanning system may, thus, be generated. Hereby, preferably, the distance between the illumination system as comprised by the scanning system and the single dot as generated by the illumination source may be determined, such as by employing the evaluation device as comprised by the at least one detector. However, the scanning system may, further, comprise an additional evaluation system which may, particularly, be configured for this purpose. Alternatively or in addition, a size of the scanning system, in particular of the housing of the scanning system, may be taken into account and, thus, the distance between a specific point on the housing of the scanning system, such as a front edge or a back edge of the housing, and the single dot may, alternatively, be determined. The illumination source may be configured for generate and/or to project a cloud of points, for example the illumination source may comprise one or more of at least one projector according to the present invention, at least one digital light processing (DLP) projector, at least one LCoS projector, at least one spatial light modulator; at least one diffractive optical element; at least one array of light emitting diodes; at least one array of laser light sources.

Alternatively, the illumination source of the scanning system may emit two individual laser beams which may be configured for providing a respective angle, such as a right angle, between the directions of an emission of the beams, whereby two respective dots located at the surface of the same object or at two different surfaces at two separate objects may be illuminated. However, other values for the respective angle between the two individual laser beams may also be feasible. This feature may, in particular, be employed for indirect measuring functions, such as for deriving an indirect distance which may not be directly accessible, such as due to a presence of one or more obstacles between the scanning system and the dot or which may otherwise be hard to reach. By way of example, it may, thus, be feasible to determine a value for a height of an object by measuring two individual distances and deriving the height by using the Pythagoras formula. In particular for being able to keep a predefined level with respect to the object, the scanning system may, further, comprise at least one leveling unit, in particular an integrated bubble vial, which may be used for keeping the predefined level by the user.

As a further alternative, the illumination source of the scanning system may emit a plurality of individual laser beams, such as an array of laser beams which may exhibit a respective pitch, in particular a regular pitch, with respect to each other and which may be arranged in a manner in order to generate an array of dots located on the at least one surface of the at least one object. For this purpose, specially adapted optical elements, such as beam-splitting devices and mirrors, may be provided which may allow a generation of the described array of the laser beams. In particular, the illumination source may be directed to scan an area or a volume by using one or more movable mirrors to redirect the light beam in a periodic or non-periodic fashion.

Thus, the scanning system may provide a static arrangement of the one or more dots placed on the one or more surfaces of the one or more objects. Alternatively, the illumination source of the scanning system, in particular the one or more laser beams, such as the above described array of the laser beams, may be configured for providing one or more light beams which may exhibit a varying intensity over time and/or which may be subject to an alternating direction of emission in a passage of time, in particular by moving one or more mirrors, such as the micro-mirrors comprised within the mentioned array of micro-mirrors. As a result, the illumination source may be configured for scanning a part of the at least one surface of the at least one object as an image by using one or more light beams with alternating features as generated by the at least one illumination source of the scanning system. In particular, the scanning system may, thus, use at least one row scan and/or line scan, such as to scan the one or more surfaces of the one or more objects sequentially or simultaneously. Thus, the scanning system may be configured for measure angles by measuring three or more dots, or the scanning system may be configured for measure corners or narrow regions such as a gable of a roof, which may be hardly accessible using a conventional measuring stick. As non-limiting examples, the scanning system may be used in safety laser scanners, e.g. in production environments, and/or in 3D-scanning devices as used for determining the shape of an object, such as in connection to 3D-printing, body scanning, quality control, in construction applications, e.g. as range meters, in logistics applications, e.g. for determining the size or volume of a parcel, in household applications, e.g. in robotic vacuum cleaners or lawn mowers, or in other kinds of applications which may include a scanning step. As non-limiting examples, the scanning system may be used in industrial safety curtain applications. As non-limiting examples, the scanning system may be used to perform sweeping, vacuuming, mopping, or waxing functions, or yard or garden care functions such as mowing or raking. As non-limiting examples, the scanning system may employ an LED illumination source with collimated optics and may be configured for shift the frequency of the illumination source to a different frequency to obtain more accurate results and/or employ a filter to attenuate certain frequencies while transmitting others. As non-limiting examples, the scanning system and/or the illumination source may be rotated as a whole or rotating only a particular optics package such as a mirror, beam splitter or the like, using a dedicated motor as such that in operation, the scanning system may have a full 360 degree view or even be moved and or rotated out of plane to further increase the scanned area. Further, the illumination source may be actively aimed in a predetermined direction. Further, to allow the rotation of wired electrical systems, slip rings, optical data transmission, or inductive couplings may be employed.

As a non-limiting example, the scanning system may be attached to a tripod and point towards an object or region with several corners and surfaces. One or more flexibly movable laser sources are attached to the scanning system. The one or more laser sources are moved as such that they illuminate points of interest. The position of the illuminated points with respect to the scanning system is measured when pressing a designated button on the scanning system and the position information is transmitted via a wireless interface to a mobile phone. The position information is stored in a mobile phone application. The laser sources are moved to illuminate further points of interest the position of which are measured and transmitted to the mobile phone application. The mobile phone application may transform the set of points into a 3d model by connecting adjacent points with planar surfaces. The 3d model may be stored and processed further. The distances and or angles between the measured points or surfaces may be displayed directly on a display attached to a scanning system or on the mobile phone to which the position information is transmitted.

As a non-limiting example, a scanning system may comprise two or more flexible movable laser sources to project points and further one movable laser source projecting a line. The line may be used to arrange the two or more laser spots along a line and the display of the scanning system may display the distance between the two or more laser spots that may be arranged along the line, such as at equal distance. In the case of two laser spots, a single laser source may be used whereas the distance of the projected points is modified using one or more beam-splitters or prisms, where a beam-splitter or prism can be moved as such that the projected laser spots move apart or closer together. Further, the scanning system may be configured for project further patterns such as a right angle, a circle, a square, a triangle, or the like, along which a measurement can be done by projecting laser spots and measuring their position.

As a non-limiting example, the scanning system may be configured as a line scanning device. In particular, the scanning system may comprise at least one sensor line or row. Triangulation systems require a sufficient baseline such that in the near filed no detection may be possible. Near field detection may be possible if the laser spot is tilted in direction of the transfer device. However, the tilting leads to that the light spot will move out of the field of view which limits detection in far field regions. These near field and far field problems can be overcome by using the detector according to the present invention. In particular, the detector may comprise a CMOS line of optical sensors. The scanning system may be configured for detect a plurality of light beams propagating from the object to the detector on the CMOS line. The light beams may be generated at different positions on the object or by movement of the illumination source. The scanning system may be configured for determine at least one longitudinal coordinate for each of the light points by determining the quotient signal Q as described above and in more detail below.

As a non-limiting example, the scanning system may be configured for support the work with tools, such as wood or metal processing tools, such as a saw, a driller, or the like. Thus, the scanning system may be configured for measure the distance in two opposite directions and display the two measured distances or the sum of the distances in a display. Further, the scanning system may be configured for measure the distance to the edge of a surface as such that when the scanning system is placed on the surface, a laser point is moved automatically away from the scanning system along the surface, until the distance measurement shows a sudden change due to a corner or the edge of a surface. This makes it possible to measure the distance of the end of a wood plank while the scanning system is placed on the plank but remote from its end. Further, the scanning system may measure the distance of the end of a plank in one direction and project a line or circle or point in a designated distance in the opposite direction. The scanning system may be configured for project the line or circle or point in a distance depending on the distance measured in the opposite direction such as depending on a predetermined sum distance. This allows working with a tool such as a saw or driller at the projected position while placing the scanning system in a safe distance from the tool and simultaneously perform a process using the tool in a predetermined distance to the edge of the plank. Further, the scanning system may be configured for project points or lines or the like in two opposite directions in a predetermined distance. When the sum of the distances is changed, only one of the projected distances changes.

As a non-limiting example, the scanning system may be configured for be placed onto a surface, such as a surface on which a task is performed, such as cutting, sawing, drilling, or the like, and to project a line onto the surface in a predetermined distance that can be adjusted such as with buttons on the scanning system.

As non-limiting examples, the scanning system may be used in safety laser scanners, e.g. in production environments, and/or in 3D-scanning devices as used for determining the shape of an object, such as in connection to 3D-printing, body scanning, quality control, in construction applications, e.g. as range meters, in logistics applications, e.g. for determining the size or volume of a parcel, in household applications, e.g. in robotic vacuum cleaners or lawn mowers, or in other kinds of applications which may include a scanning step.

The transfer device can, as explained above, be designed to feed light propagating from the object to the detector to the optical sensor, preferably successively. As explained above, this feeding can optionally be effected by means of imaging or else by means of non-imaging properties of the transfer device. In particular the transfer device can also be designed to collect the electromagnetic radiation before the latter is fed to the optical sensor. The transfer device can also be wholly or partly a constituent part of at least one optional illumination source, for example by the illumination source being designed to provide a light beam having defined optical properties, for example having a defined or precisely known beam profile, for example at least one linear combination of Gaussian beams, in particular at least one laser beam having a known beam profile.

For potential embodiments of the optional illumination source, reference may be made to WO 2012/110924 A1. Still, other embodiments are feasible. Light emerging from the object can originate in the object itself, but can also optionally have a different origin and propagate from this origin to the object and subsequently toward the transversal and/or longitudinal optical sensor. The latter case can be effected for example by at least one illumination source being used. This illumination source can for example be or comprise an ambient illumination source and/or may be or may comprise an artificial illumination source. By way of example, the detector itself can comprise the at least one illumination source, for example at least one laser and/or at least one incandescent lamp and/or at least one semiconductor illumination source, for example, at least one light-emitting diode, in particular an organic and/or inorganic light-emitting diode. On account of their generally defined beam profiles and other properties of handleability, the use of one or a plurality of lasers as illumination source or as part thereof, is particularly preferred. The illumination source itself can be a constituent part of the detector or else be formed independently of the detector. The illumination source can be integrated in particular into the detector, for example a housing of the detector. Alternatively or additionally, at least one illumination source can also be integrated into the at least one beacon device or into one or more of the beacon devices and/or into the object or connected or spatially coupled to the object.

The light emerging from the one or more optional beacon devices can accordingly, alternatively or additionally from the option that said light originates in the respective beacon device itself, emerge from the illumination source and/or be excited by the illumination source. By way of example, the electromagnetic light emerging from the beacon device can be emitted by the beacon device itself and/or be reflected by the beacon device and/or be scattered by the beacon device before it is fed to the detector. In this case, emission and/or scattering of the electromagnetic radiation can be effected without spectral influencing of the electromagnetic radiation or with such influencing. Thus, by way of example, a wavelength shift can also occur during scattering, for example according to Stokes or Raman. Furthermore, emission of light can be excited, for example, by a primary illumination source, for example by the object or a partial region of the object being excited to generate luminescence, in particular phosphorescence and/or fluorescence. Other emission processes are also possible, in principle. If a reflection occurs, then the object can have for example at least one reflective region, in particular at least one reflective surface. Said reflective surface can be a part of the object itself, but can also be for example a reflector which is connected or spatially coupled to the object, for example a reflector plaque connected to the object. If at least one reflector is used, then it can in turn also be regarded as part of the detector which is connected to the object, for example, independently of other constituent parts of the detector.

The beacon devices and/or the at least one optional illumination source generally may emit light in at least one of: the ultraviolet spectral range, preferably in the range of 200 nm to 380 nm; the visible spectral range (380 nm to 780 nm); the infrared spectral range, preferably in the range of 780 nm to 3.0 micrometers, more preferably in the part of the near infrared region where silicon photodiodes are applicable specifically in the range of 700 nm to 1000 nm. For thermal imaging applications the target may emit light in the far infrared spectral range, preferably in the range of 3.0 micrometers to 20 micrometers. For example, the at least one illumination source is configured for emit light in the visible spectral range, preferably in the range of 500 nm to 780 nm, most preferably at 650 nm to 750 nm or at 690 nm to 700 nm. For example, the at least one illumination source is configured for emit light in the infrared spectral range. Other options, however, are feasible.

The feeding of the light beam to the optical sensor can be effected in particular in such a way that a light spot, for example having a round, oval or differently configured cross section, is produced on the optional sensor area of the optical sensor. By way of example, the detector can have a visual range, in particular a solid angle range and/or spatial range, within which objects can be detected. Preferably, the transfer device may be designed in such a way that the light spot, for example in the case of an object arranged within a visual range of the detector, is arranged completely on a sensor region and/or on a sensor area of the optical sensor. By way of example, a sensor area can be chosen to have a corresponding size in order to ensure this condition.

In a further aspect, the present invention discloses a method for determining a position of at least one object by using a detector, such as a detector according to the present invention, such as according to one or more of the embodiments referring to a detector as disclosed above or as disclosed in further detail below. Still, other types of detectors may be used. The method comprises the following method steps, wherein the method steps may be performed in the given order or may be performed in a different order. Further, one or more additional method steps may be present which are not listed. Further, one, more than one or even all of the method steps may be performed repeatedly.

The method comprises the following method steps:
Illuminating the object with at least two illumination patterns generated by at least one projector of the detector;
generating at least two sensor signals in response to an illumination of at least one sensor element having a matrix of optical sensors by at least one reflection light beam propagating from the object to the detector, the optical sensors each having a light-sensitive area;
determining at least one reflection image by using the sensor element;
selecting at least one reflection feature of the reflection image and evaluating the sensor signals by using at least one evaluation device, thereby, determining at least one longitudinal coordinate z of the selected reflection feature, wherein the evaluating comprises evaluating a combined signal Q from the sensor signals.

For details, options and definitions, reference may be made to the detector as discussed above. Thus, specifically, as outlined above, the method may comprise using the detector according to the present invention, such as according to one or more of the embodiments given above or given in further detail below.

As outlined above, the projector comprises at least one tunable laser source and at least one diffractive optical element. The method may comprise controlling at least one property of the tunable laser source by using at least one control unit. For example, the projector may be operable in at least two emission modes, wherein the method may comprise adjusting the emission mode by using the control unit by applying an electrical signal to the tunable laser source, wherein in a first emission mode the tunable laser source has a first emission wavelength $\lambda_1$ and in a second emission mode the tunable laser source has a second emission wavelength $\lambda_2$ different from the first emission wavelength $\lambda_1$.

In a further aspect of the present invention, use of the detector according to the present invention, such as according to one or more of the embodiments given above or given in further detail below, is proposed, for a purpose of use, selected from the group consisting of: a position measurement in traffic technology; an entertainment application; a security application; a surveillance application; a safety application; a human-machine interface application; a tracking application; a photography application; an imaging application or camera application; a mapping application for generating maps of at least one space; a homing or tracking beacon detector for vehicles; an outdoor application; a mobile application; a communication application; a machine vision application; a robotics application; a quality control application; a manufacturing application.

The object generally may be a living or non-living object. The detector or the detector system even may comprise the at least one object, the object thereby forming part of the detector system. Preferably, however, the object may move independently from the detector, in at least one spatial dimension. The object generally may be an arbitrary object. In one embodiment, the object may be a rigid object. Other embodiments are feasible, such as embodiments in which the object is a non-rigid object or an object which may change its shape.

With respect to further uses of the detector and devices of the present invention reference is made to WO 2018/091649 A1, WO 2018/091638 A1 and WO 2018/091640 A1, the content of which is included by reference.

Specifically, the present application may be applied in the field of photography. Thus, the detector may be part of a photographic device, specifically of a digital camera. Specifically, the detector may be used for 3D photography, specifically for digital 3D photography. Thus, the detector may form a digital 3D camera or may be part of a digital 3D camera. As used herein, the term photography generally refers to the technology of acquiring image information of at least one object. As further used herein, a camera generally is a device configured for performing photography. As further used herein, the term digital photography generally refers to the technology of acquiring image information of at least one object by using a plurality of light-sensitive elements configured to generate electrical signals indicating an intensity and/or color of illumination, preferably digital electrical signals. As further used herein, the term 3D photography generally refers to the technology of acquiring image information of at least one object in three spatial dimensions. Accordingly, a 3D camera is a device configured for performing 3D photography. The camera generally may be configured for acquiring a single image, such as a single 3D image, or may be configured for acquiring a plurality of images, such as a sequence of images. Thus, the camera may also be a video camera configured for video applications, such as for acquiring digital video sequences.

Thus, generally, the present invention further refers to a camera, specifically a digital camera, more specifically a 3D camera or digital 3D camera, for imaging at least one object. As outlined above, the term imaging, as used herein, generally refers to acquiring image information of at least one object. The camera comprises at least one detector according to the present invention. The camera, as outlined above, may be configured for acquiring a single image or for acquiring a plurality of images, such as image sequence, preferably for acquiring digital video sequences. Thus, as an example, the camera may be or may comprise a video camera. In the latter case, the camera preferably comprises a data memory for storing the image sequence.

As used within the present invention, the expression "position" generally refers to at least one item of information regarding one or more of an absolute position and an orientation of one or more points of the object. Thus, specifically, the position may be determined in a coordinate system of the detector, such as in a Cartesian coordinate system. Additionally or alternatively, however, other types of coordinate systems may be used, such as polar coordinate systems and/or spherical coordinate systems.

As outlined above and as will be outlined in further detail below, the present invention preferably may be applied in the field of human-machine interfaces, in the field of sports and/or in the field of computer games. Thus, preferably, the object may be selected from the group consisting of: an article of sports equipment, preferably an article selected from the group consisting of a racket, a club, a bat, an article of clothing, a hat, a shoe. Other embodiments are feasible.

With regard to the coordinate system for determining the position of the object, which may be a coordinate system of the detector, the detector may constitute a coordinate system in which an optical axis of the detector forms the z-axis and in which, additionally, an x-axis and a y-axis may be provided which are perpendicular to the z-axis and which are perpendicular to each other. As an example, the detector and/or a part of the detector may rest at a specific point in this coordinate system, such as at the origin of this coordinate system. In this coordinate system, a direction parallel or antiparallel to the z-axis may be regarded as a longitudinal direction, and a coordinate along the z-axis may be considered a longitudinal coordinate. An arbitrary direction perpendicular to the longitudinal direction may be considered a transversal direction, and an x- and/or y-coordinate may be considered a transversal coordinate.

Alternatively, other types of coordinate systems may be used. Thus, as an example, a polar coordinate system may be used in which the optical axis forms a z-axis and in which a distance from the z-axis and a polar angle may be used as additional coordinates. Again, a direction parallel or antiparallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

The detector may be a device configured for providing at least one item of information on the position of the at least one object and/or a part thereof. Thus, the position may refer to an item of information fully describing the position of the object or a part thereof, preferably in the coordinate system of the detector, or may refer to a partial information, which only partially describes the position. The detector generally may be a device configured for detecting light beams, such as the light beams propagating from the beacon devices towards the detector.

The evaluation device and the detector may fully or partially be integrated into a single device. Thus, generally, the evaluation device also may form part of the detector. Alternatively, the evaluation device and the detector may fully or partially be embodied as separate devices. The detector may comprise further components.

The detector may be a stationary device or a mobile device. Further, the detector may be a stand-alone device or may form part of another device, such as a computer, a vehicle or any other device. Further, the detector may be a hand-held device. Other embodiments of the detector are feasible.

The evaluation device may be or may comprise one or more integrated circuits, such as one or more application-specific integrated circuits (ASICs), and/or one or more data processing devices, such as one or more computers, preferably one or more microcomputers and/or microcontrollers, Field Programmable Arrays, or Digital Signal Processors. Additional components may be comprised, such as one or more preprocessing devices and/or data acquisition devices, such as one or more devices for receiving and/or preprocessing of the sensor signals, such as one or more AD-converters and/or one or more filters. Further, the evaluation device may comprise one or more measurement devices, such as one or more measurement devices for measuring electrical currents and/or electrical voltages. Further, the evaluation device may comprise one or more data storage devices. Further, the evaluation device may comprise one or more interfaces, such as one or more wireless interfaces and/or one or more wire-bound interfaces.

The at least one evaluation device may be configured to perform at least one computer program, such as at least one computer program configured for performing or supporting one or more or even all of the method steps of the method according to the present invention. As an example, one or more algorithms may be implemented which, by using the sensor signals as input variables, may determine the position of the object.

The evaluation device can be connected to or may comprise at least one further data processing device that may be used for one or more of displaying, visualizing, analyzing, distributing, communicating or further processing of information, such as information obtained by the optical sensor and/or by the evaluation device. The data processing device, as an example, may be connected or incorporate at least one of a display, a projector, a monitor, an LCD, a TFT, a loudspeaker, a multichannel sound system, an LED pattern, or a further visualization device. It may further be connected or incorporate at least one of a communication device or communication interface, a connector or a port, capable of sending encrypted or unencrypted information using one or more of email, text messages, telephone, Bluetooth, Wi-Fi, infrared or internet interfaces, ports or connections. It may further be connected to or incorporate at least one of a processor, a graphics processor, a CPU, an Open Multimedia Applications Platform (OMAP™), an integrated circuit, a system on a chip such as products from the Apple A series or the Samsung S3C2 series, a microcontroller or microprocessor, one or more memory blocks such as ROM, RAM, EEPROM, or flash memory, timing sources such as oscillators or phase-locked loops, counter-timers, real-time timers, or power-on reset generators, voltage regulators, power management circuits, or DMA controllers. Individual units may further be connected by buses such as AMBA buses or be integrated in an Internet of Things or Industry 4.0 type network.

The evaluation device and/or the data processing device may be connected by or have further external interfaces or ports such as one or more of serial or parallel interfaces or ports, USB, Centronics Port, FireWire, HDMI, Ethernet, Bluetooth, RFID, Wi-Fi, USART, or SPI, or analogue interfaces or ports such as one or more of ADCs or DACs, or standardized interfaces or ports to further devices such as a 2D-camera device using an RGB-interface such as CameraLink. The evaluation device and/or the data processing device may further be connected by one or more of interprocessor interfaces or ports, FPGA-FPGA-interfaces, or serial or parallel interfaces ports. The evaluation device and the data processing device may further be connected to one or more of an optical disc drive, a CD-RW drive, a DVD+RW drive, a flash drive, a memory card, a disk drive, a hard disk drive, a solid state disk or a solid state hard disk.

The evaluation device and/or the data processing device may be connected by or have one or more further external connectors such as one or more of phone connectors, RCA connectors, VGA connectors, hermaphrodite connectors, USB connectors, HDMI connectors, 8P8C connectors, BCN connectors, IEC 60320 C14 connectors, optical fiber connectors, D-subminiature connectors, RF connectors, coaxial connectors, SCART connectors, XLR connectors, and/or may incorporate at least one suitable socket for one or more of these connectors.

Possible embodiments of a single device incorporating one or more of the detectors according to the present invention, the evaluation device or the data processing device, such as incorporating one or more of the optical sensor, optical systems, evaluation device, communication device, data processing device, interfaces, system on a chip, display devices, or further electronic devices, are: mobile phones, personal computers, tablet PCs, televisions, game consoles or further entertainment devices. In a further embodiment, the 3D-camera functionality which will be outlined in further detail below may be integrated in devices that are available with conventional 2D-digital cameras, without a noticeable difference in the housing or appearance of the device, where the noticeable difference for the user may only be the functionality of obtaining and or processing 3D information. Further, devices according to the present invention may be used in 360° digital cameras or surround view cameras.

Specifically, an embodiment incorporating the detector and/or a part thereof such as the evaluation device and/or the data processing device may be: a mobile phone incorporating a display device, a data processing device, the optical sensor, optionally the sensor optics, and the evaluation device, for the functionality of a 3D camera. The detector according to the present invention specifically may be suitable for integration in entertainment devices and/or communication devices such as a mobile phone.

The human-machine interface may comprise a plurality of beacon devices which are configured to be at least one of directly or indirectly attached to the user and held by the user. Thus, the beacon devices each may independently be attached to the user by any suitable means, such as by an appropriate fixing device. Additionally or alternatively, the user may hold and/or carry the at least one beacon device or one or more of the beacon devices in his or her hands and/or by wearing the at least one beacon device and/or a garment containing the beacon device on a body part.

The beacon device generally may be an arbitrary device which may be detected by the at least one detector and/or which facilitates detection by the at least one detector. Thus, as outlined above or as will be outlined in further detail below, the beacon device may be an active beacon device configured for generating the at least one light beam to be detected by the detector, such as by having one or more illumination sources for generating the at least one light beam. Additionally or alternatively, the beacon device may fully or partially be designed as a passive beacon device, such as by providing one or more reflective elements configured to reflect a light beam generated by a separate illumination source. The at least one beacon device may permanently or temporarily be attached to the user in a direct or indirect way and/or may be carried or held by the user. The attachment may take place by using one or more attachment means and/or by the user himself or herself, such as by the user holding the at least one beacon device by hand and/or by the user wearing the beacon device.

Additionally or alternatively, the beacon devices may be at least one of attached to an object and integrated into an object held by the user, which, in the sense of the present invention, shall be included into the meaning of the option of the user holding the beacon devices. Thus, as will be outlined in further detail below, the beacon devices may be attached to or integrated into a control element which may be part of the human-machine interface and which may be held or carried by the user, and of which the orientation may be recognized by the detector device. Thus, generally, the present invention also refers to a detector system comprising at least one detector device according to the present invention and which, further, may comprise at least one object, wherein the beacon devices are one of attached to the object, held by the object and integrated into the object. As an example, the object preferably may form a control element, the orientation of which may be recognized by a user. Thus, the detector system may be part of the human-machine interface as outlined above or as outlined in further detail below. As an example, the user may handle the control element in a specific way in order to transmit one or more items of information to a machine, such as in order to transmit one or more commands to the machine.

Alternatively, the detector system may be used in other ways. Thus, as an example, the object of the detector system may be different from a user or a body part of the user and, as an example, may be an object which moves independently from the user. As an example, the detector system may be used for controlling apparatuses and/or industrial processes, such as manufacturing processes and/or robotics processes. Thus, as an example, the object may be a machine and/or a machine part, such as a robot arm, the orientation of which may be detected by using the detector system.

The human-machine interface may be configured in such a way that the detector device generates at least one item of information on the position of the user or of at least one body part of the user. Specifically in case a manner of attachment of the at least one beacon device to the user is known, by evaluating the position of the at least one beacon device, at least one item of information on a position and/or an orientation of the user or of a body part of the user may be gained.

The beacon device preferably is one of a beacon device attachable to a body or a body part of the user and a beacon device which may be held by the user. As outlined above, the beacon device may fully or partially be designed as an active beacon device. Thus, the beacon device may comprise at least one illumination source configured to generate at least one light beam to be transmitted to the detector, preferably at least one light beam having known beam properties. Additionally or alternatively, the beacon device may comprise at least one reflector configured to reflect light generated by an illumination source, thereby generating a reflected light beam to be transmitted to the detector.

The object, which may form part of the detector system, may generally have an arbitrary shape. Preferably, the object being part of the detector system, as outlined above, may be a control element which may be handled by a user, such as manually. As an example, the control element may be or may comprise at least one element selected from the group consisting of: a glove, a jacket, a hat, shoes, trousers and a suit, a stick that may be held by hand, a bat, a club, a racket, a cane, a toy, such as a toy gun. Thus, as an example, the detector system may be part of the human-machine interface and/or of the entertainment device.

As used herein, an entertainment device is a device which may serve the purpose of leisure and/or entertainment of one or more users, in the following also referred to as one or more players. As an example, the entertainment device may serve the purpose of gaming, preferably computer gaming. Thus, the entertainment device may be implemented into a computer, a computer network or a computer system or may comprise a computer, a computer network or a computer system which runs one or more gaming software programs.

The entertainment device comprises at least one human-machine interface according to the present invention, such as according to one or more of the embodiments disclosed above and/or according to one or more of the embodiments disclosed below. The entertainment device is designed to enable at least one item of information to be input by a player by means of the human-machine interface. The at least one item of information may be transmitted to and/or may be used by a controller and/or a computer of the entertainment device. The at least one item of information preferably may comprise at least one command configured for influencing the course of a game. Thus, as an example, the at least one item of information may include at least one item of information on at least one orientation of the player and/or of one or more body parts of the player, thereby allowing for the player to simulate a specific position and/or orientation and/or action required for gaming. As an example, one or more of the following movements may be simulated and communicated to a controller and/or a computer of the entertainment device: dancing; running; jumping; swinging of a racket; swinging of a bat; swinging of a club; pointing of an object towards another object, such as pointing of a toy gun towards a target.

The entertainment device as a part or as a whole, preferably a controller and/or a computer of the entertainment device, is designed to vary the entertainment function in accordance with the information. Thus, as outlined above, a course of a game might be influenced in accordance with the at least one item of information. Thus, the entertainment device might include one or more controllers which might be separate from the evaluation device of the at least one detector and/or which might be fully or partially identical to the at least one evaluation device or which might even include the at least one evaluation device. Preferably, the at least one controller might include one or more data processing devices, such as one or more computers and/or microcontrollers.

As further used herein, a tracking system is a device which is configured to gather information on a series of past positions of the at least one object and/or at least one part of the object. Additionally, the tracking system may be configured to provide information on at least one predicted future position and/or orientation of the at least one object or the at least one part of the object. The tracking system may have at least one track controller, which may fully or partially be embodied as an electronic device, preferably as at least one data processing device, more preferably as at least one computer or microcontroller. Again, the at least one track controller may fully or partially comprise the at least one evaluation device and/or may be part of the at least one evaluation device and/or may fully or partially be identical to the at least one evaluation device.

The tracking system comprises at least one detector according to the present invention, such as at least one detector as disclosed in one or more of the embodiments listed above and/or as disclosed in one or more of the embodiments below. The tracking system further comprises at least one track controller. The track controller is configured to track a series of positions of the object at specific points in time, such as by recording groups of data or data pairs, each group of data or data pair comprising at least one position information and at least one time information.

The tracking system may further comprise the at least one detector system according to the present invention. Thus, besides the at least one detector and the at least one evaluation device and the optional at least one beacon device, the tracking system may further comprise the object itself or a part of the object, such as at least one control element comprising the beacon devices or at least one beacon device, wherein the control element is directly or indirectly attachable to or integratable into the object to be tracked.

The tracking system may be configured to initiate one or more actions of the tracking system itself and/or of one or more separate devices. For the latter purpose, the tracking system, preferably the track controller, may have one or more wireless and/or wire-bound interfaces and/or other types of control connections for initiating at least one action. Preferably, the at least one track controller may be configured to initiate at least one action in accordance with at least one actual position of the object. As an example, the action may be selected from the group consisting of: a prediction of a future position of the object; pointing at least one device towards the object; pointing at least one device towards the detector; illuminating the object; illuminating the detector.

As an example of application of a tracking system, the tracking system may be used for continuously pointing at least one first object to at least one second object even though the first object and/or the second object might move. Potential examples, again, may be found in industrial applications, such as in robotics and/or for continuously working on an article even though the article is moving, such as during manufacturing in a manufacturing line or assembly line. Additionally or alternatively, the tracking system might be used for illumination purposes, such as for continuously illuminating the object by continuously pointing an illumination source to the object even though the object might be moving. Further applications might be found in communication systems, such as in order to continuously transmit information to a moving object by pointing a transmitter towards the moving object.

Overall, in the context of the present invention, the following embodiments are regarded as preferred:

Embodiment 1: A projector for illuminating at least one object with at least two illumination patterns, wherein the projector comprises at least one tunable laser source and at least one diffractive optical element, wherein the projector is configured to generate the at least two illumination patterns each comprising a plurality of illumination features by controlling at least one property of the tunable laser source, wherein the projector comprises at least one control unit, wherein the control unit is configured for controlling the at least one property of the tunable laser source.

Embodiment 2: The projector according to the preceding embodiment, wherein the at least one property of the tunable laser source is at least one property selected from the group consisting of a voltage, a current, a temperature, an emission wavelength, an intensity and the like.

Embodiment 3: The projector according to any one of the preceding embodiments, wherein the control unit is configured to control the at least one property of the tunable laser source by applying an electrical signal to the tunable laser source.

Embodiment 4: The projector according to any one of the preceding embodiments, wherein the projector is configured to project the two illumination patterns to at least partly differing locations.

Embodiment 5: The projector according to any one of the preceding embodiments, wherein the projector is operable in at least two emission modes, wherein the control unit is configured to adjust the emission mode by applying an electrical signal to the tunable laser source, wherein in a first emission mode the tunable laser source has a first emission wavelength $\lambda_1$ and in a second emission mode the tunable laser source has a second emission wavelength $\lambda_2$ different from the first emission wavelength $\lambda_1$.

Embodiment 6: The projector according to the preceding embodiment, wherein the emission wavelength of the tunable laser source is adjustable by one or more of varying a driver current, changing a MEMS state, changing the modulation of an electro-optical or acousto-optical modulator or the like.

Embodiment 7: The projector according to any one of the two preceding embodiments, wherein the control unit is configured to adjust the emission wavelength in steps or continuously thereby adjusting the location of the illumination patterns.

Embodiment 8: The projector according to the preceding embodiment, wherein the control unit is configured to adjust the emission wavelength in steps, wherein the step size is within a range from 0.001 to 5 nm, preferably within a range from 0.01 to 0.5 nm, most preferably within a range from 0.05 to 0.15 nm.

Embodiment 9: The projector according to any one of the four preceding embodiments, wherein the first emission wavelength $\lambda_1$ and the second emission wavelength $\lambda_2$ are separable, wherein the first emission wavelength $\lambda_1$ and the second emission wavelength $\lambda_2$ differ by 40 nm≥|$\lambda_1-\lambda_2$|≥1 nm, preferably by 30 nm≥|$\lambda_1-\lambda_2$|≥2.5 nm, more preferably by 20 nm≥|$\lambda_1-\lambda_2$|≥4 nm.

Embodiment 10: The projector according to any one of the five preceding embodiments, wherein the first emission wavelength $\lambda_1$ and the second emission wavelength $\lambda_2$ are stable, wherein variations in wavelength $\Delta\lambda$ are small compared to the wavelength, wherein $\Delta\lambda \leq 1.5\%$, preferably $\Delta\lambda \leq 0.5\%$, more preferably $\Delta\lambda \leq 0.1\%$.

Embodiment 11: The projector according to any one of the six preceding embodiments, wherein the emission modes differ in intensity.

Embodiment 12: The projector according to any one of the seven preceding embodiments, wherein illumination patterns generated in different emission modes have different opening angles, wherein the opening angles differ by 0.5° or more, preferably by 1.5° or more, more preferably by 2.5° or more.

Embodiment 13: The projector according to any one of the eight preceding embodiments, wherein a minimal distance where the diffractive optical element generates the illumination patterns changes upon changing the emission mode.

Embodiment 14: The projector according to any one of the preceding embodiments, wherein the tunable laser source is configured to generate at least one light pulse, wherein the light pulse comprises at least one beam profile, wherein the control unit is configured to adjust a wavelength of the light pulse such that the wavelength within the beam profile of the light pulse varies by a wavelength variation $\Delta\Lambda$ by applying an electrical signal to the tunable laser source and/or to adjust wavelengths of light pulses of a series of light pulses such that the wavelengths of at least two light pulses of the series of light pulses vary by the wavelength variation $\Delta\Lambda$.

Embodiment 15: The projector according to the preceding embodiment, wherein the wavelength of the light pulse is adjustable by one or more of varying a driver current, changing a MEMS state, changing the modulation of an electro-optical or acousto-optical modulator or the like.

Embodiment 16: The projector according to any one of the two preceding embodiments, wherein the wavelength variation ΔΛ is small compared to the wavelength, wherein the wavelength variation is within a range of 0.01%≤|ΔΛ|≤10%, preferably 0.02%≤|ΔΛ|≤2%, more preferably 0.075%≤|ΔΛ|≤0.75%.

Embodiment 17: The projector according to any one of the preceding embodiments, wherein the projector comprises an equal number of tunable laser sources and diffractive optical elements.

Embodiment 18: The projector according to any one of the preceding embodiments, wherein the projector comprises one diffractive optical element and one laser source.

Embodiment 19: The projector according to any one of the preceding embodiments, wherein each of the illumination patterns comprises at least one pattern selected from the group consisting of: at least one point pattern, in particular a pseudo-random point pattern; at least one pattern comprising at least one pre-known feature; a random point pattern or a quasi random pattern; at least one Sobol pattern; at least one quasi-periodic pattern; at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines.

Embodiment 20: A detector for determining a position of at least one object, the detector comprising:
at least one projector for illuminating the object with at least two illumination patterns according to any one of the preceding embodiments;
at least one sensor element having a matrix of optical sensors, the optical sensors each having a light-sensitive area, wherein each optical sensor is designed to generate at least one sensor signal in response to an illumination of its respective light-sensitive area by a reflection light beam propagating from the object to the detector, wherein the sensor element is configured to determine at least one reflection image;
at least one evaluation device, wherein the evaluation device is configured to select at least one reflection feature of the reflection image, wherein the evaluation device is configured for determining at least one longitudinal coordinate z of the selected reflection feature of the reflection image by evaluating a combined signal Q from the sensor signals.

Embodiment 21: The detector according to the preceding embodiment, wherein the sensor element is configured to determine the reflection image within at least one imaging frame, wherein a duration of a single imaging frame corresponds to a pulse duration of the tunable laser source of the projector or a duration of a series of pulses of the tunable laser source of the projector.

Embodiment 22: The detector according to the preceding embodiment, wherein the series of pulses comprises a plurality of pulses, wherein the number of pulses per pulse sequence is in a range from 2 to 20000 pulses, preferably in a range from 5 to 10000 pulses, more preferably in a range from 10 to 1000 pulses.

Embodiment 23: The detector according to any one of the preceding embodiments referring to a detector, wherein the optical sensors are part of or constitute at least one global shutter CMOS.

Embodiment 24: The detector according to any one of the preceding embodiments referring to a detector, wherein the evaluation device is configured for deriving the combined signal Q by one or more of dividing the sensor signals, dividing multiples of the sensor signals, dividing linear combinations of the sensor signals.

Embodiment 25: The detector according to any one of the preceding embodiments referring to a detector, wherein the evaluation device is configured for using at least one predetermined relationship between the combined signal Q and the longitudinal coordinate z for determining the longitudinal coordinate.

Embodiment 26: The detector according to any one of the preceding embodiments referring to a detector, wherein the evaluation device is configured for deriving the combined signal Q by $$Q(z_O) = \frac{\int\int_{A_1} E(x, y; z_O) dx dy}{\int\int_{A_2} E(x, y; z_O) dx dy}$$

wherein x and y are transversal coordinates, A1 and A2 are different areas of at least one beam profile of the reflection light beam at a position of the sensor element, and $E(x,y,z_o)$ denotes the beam profile given at the object distance $z_o$, wherein each of the sensor signals comprises at least one information of at least one area of the beam profile of the reflection light beam.

Embodiment 27: The detector according to the preceding embodiment, wherein the light-sensitive areas are arranged such that a first sensor signal comprises information of a first area of the beam profiles and a second sensor signal comprises information of a second area of the beam profile, wherein the first area of the beam profile and the second area of the beam profile are one or both of adjacent or overlapping regions.

Embodiment 28: The detector according to the preceding embodiment, wherein the evaluation device is configured to determine the first area of the beam profile and the second area of the beam profile, wherein the first area of the beam profile comprises essentially edge information of the beam profile and the second area of the beam profile comprises essentially center information of the beam profile, wherein the edge information comprises information relating to a number of photons in the first area of the beam profile and the center information comprises information relating to a number of photons in the second area of the beam profile.

Embodiment 29: The detector according to any one of the preceding embodiments referring to a detector, wherein the at least one evaluation device is configured for evaluating the sensor signals, by
a) determining at least one optical sensor having the highest sensor signal and forming at least one center signal;
b) evaluating the sensor signals of the optical sensors of the matrix and forming at least one sum signal;
c) determining at least one combined signal by combining the center signal and the sum signal; and d) determining the longitudinal region by evaluating the combined signal.

Embodiment 30: The detector according to the preceding embodiment, wherein the combined signal is a quotient signal Q, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa.

Embodiment 31: The detector according to any one of the preceding embodiments referring to a detector, wherein the evaluation device is configured to determine a longitudinal region of the selected reflection feature by evaluating the combined signal Q, wherein the longitudinal region is given by the longitudinal coordinate z and an error interval E, wherein the evaluation device is configured to determine at least one displacement region in at least one reference image corresponding to the longitudinal region, wherein the evaluation device is configured to match the selected reflection feature with at least one reference feature within the displacement region, wherein the evaluation device is configured to determine a displacement of the matched reference feature and the selected reflection feature, wherein the evaluation device is configured to determine a longitudinal information of the matched reference feature using a predetermined relationship between the longitudinal information and the displacement.

Embodiment 32: The detector according to the preceding embodiment, wherein the reference image and the reflection image are images of the object determined at different spatial positions having a fixed distance, wherein the evaluation device is configured to determine an epipolar line in the reference image.

Embodiment 33: The detector according to any one of the two preceding embodiments, wherein the displacement region extends along the epipolar line, wherein the evaluation device is configured to determine the reference feature along the epipolar line corresponding to the longitudinal coordinate z and to determine an extent of the displacement region along the epipolar line corresponding to the error interval $\pm\varepsilon$.

Embodiment 34: The detector according to the preceding embodiment, wherein the evaluation device is configured to perform the following steps:
  Determining the displacement region for the image position of each reflection feature;
  Assigning an epipolar line to the displacement region of each reflection feature such as by assigning the epipolar line closest to a displacement region and/or within a displacement region and/or closest to a displacement region along a direction orthogonal to the epipolar line;
  Assigning and/or determining at least one reference feature to each reflection feature such as by assigning the reference feature closest to the assigned displacement region and/or within the assigned displacement region and/or closest to the assigned displacement region along the assigned epipolar line and/or within the assigned displacement region along the assigned epipolar line.

Embodiment 35: The detector according to any one of the four preceding embodiments, wherein the evaluation device is configured to match the selected feature of the reflection image with the reference feature within the displacement region by using at least one evaluation algorithm considering the determined longitudinal coordinate z, wherein the evaluation algorithm is a linear scaling algorithm.

Embodiment 36: The detector according to any one of the five preceding embodiments, wherein the detector comprises at least two sensor elements each having a matrix of optical sensors, where at least one first sensor element and at least one second sensor element are positioned at different spatial positions, wherein a relative distance between the first sensor element and the second element is fixed, wherein the at least one first sensor element is configured to determine at least one first reflection pattern and the at least one second sensor element is configured to determine at least one second reflection pattern, wherein the evaluation device is configured to select at least one image determined by the first sensor element or the second sensor element as reflection image and to select at least one image determined by the other one of the first sensor element or the second sensor element as reference image.

Embodiment 37: A detector system for determining a position of at least one object, the detector system comprising at least one detector according to any one of the preceding embodiments referring to a detector, the detector system further comprising at least one beacon device configured to direct at least one light beam towards the detector, wherein the beacon device is at least one of attachable to the object, holdable by the object and integratable into the object.

Embodiment 38: A human-machine interface for exchanging at least one item of information between a user and a machine, wherein the human-machine interface comprises at least one detector system according to the preceding embodiment, wherein the at least one beacon device is configured to be at least one of directly or indirectly attached to the user and held by the user, wherein the human-machine interface is designed to determine at least one position of the user by means of the detector system, wherein the human-machine interface is designed to assign to the position at least one item of information.

Embodiment 39: An entertainment device for carrying out at least one entertainment function, wherein the entertainment device comprises at least one human-machine interface according to the preceding embodiment, wherein the entertainment device is designed to enable at least one item of information to be input by a player by means of the human-machine interface, wherein the entertainment device is designed to vary the entertainment function in accordance with the information.

Embodiment 40: A tracking system for tracking a position of at least one movable object, the tracking system comprising at least one detector system according to any one of the preceding embodiments referring to a detector system, the tracking system further comprising at least one track controller, wherein the track controller is configured to track a series of positions of the object at specific points in time.

Embodiment 41: A scanning system for determining a depth profile of a scenery, the scanning system comprising at least one detector according to any of the preceding embodiments referring to a detector, the scanning system further comprising at least one illumination source configured to scan the scenery with at least one light beam.

Embodiment 42: A camera for imaging at least one object, the camera comprising at least one detector according to any one of the preceding embodiments referring to a detector.

Embodiment 43: A method for determining a position of at least one object by using at least one detector according to any one of the preceding embodiments referring to a detector, the method comprising the following steps:

Illuminating the object with at least two illumination patterns generated by at least one projector of the detector;

generating at least two sensor signals in response to an illumination of at least one sensor element having a matrix of optical sensors by at least one reflection light beam propagating from the object to the detector, the optical sensors each having a light-sensitive area;

determining at least one reflection image by using the sensor element;

selecting at least one reflection feature of the reflection image and evaluating the sensor signals by using at least one evaluation device, thereby, determining at least one longitudinal coordinate z of the selected reflection feature, wherein the evaluating comprises evaluating a combined signal Q from the sensor signals.

Embodiment 44: The method according to the preceding embodiment, wherein the projector comprises at least one tunable laser source and at least one diffractive optical element, wherein the method comprises controlling at least one property of the tunable laser source by using at least one control unit.

Embodiment 45: The method according to the preceding embodiment, wherein the projector is operable in at least two emission modes, wherein the method comprises adjusting the emission mode by using the control unit by applying an electrical signal to the tunable laser source, wherein in a first emission mode the tunable laser source has a first emission wavelength $\lambda_1$ and in a second emission mode the tunable laser source has a second emission wavelength $\lambda_2$ different from the first emission wavelength $\lambda_1$.

Embodiment 46: A use of the detector according to any one of the preceding embodiments referring to a detector, for a purpose of use, selected from the group consisting of: a position measurement in traffic technology; an entertainment application; a security application; a surveillance application; a safety application; a human-machine interface application; a logistics application; a tracking application; an outdoor application; a mobile application; a communication application; a photography application; a machine vision application; a robotics application; a quality control application; a manufacturing application.

BRIEF DESCRIPTION OF THE FIGURES

Further optional details and features of the invention are evident from the description of preferred exemplary embodiments which follows in conjunction with the dependent claims. In this context, the particular features may be implemented in an isolated fashion or in combination with other features. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

DETAILED DESCRIPTION OF THE EMBODIMENTS

Figure 1:
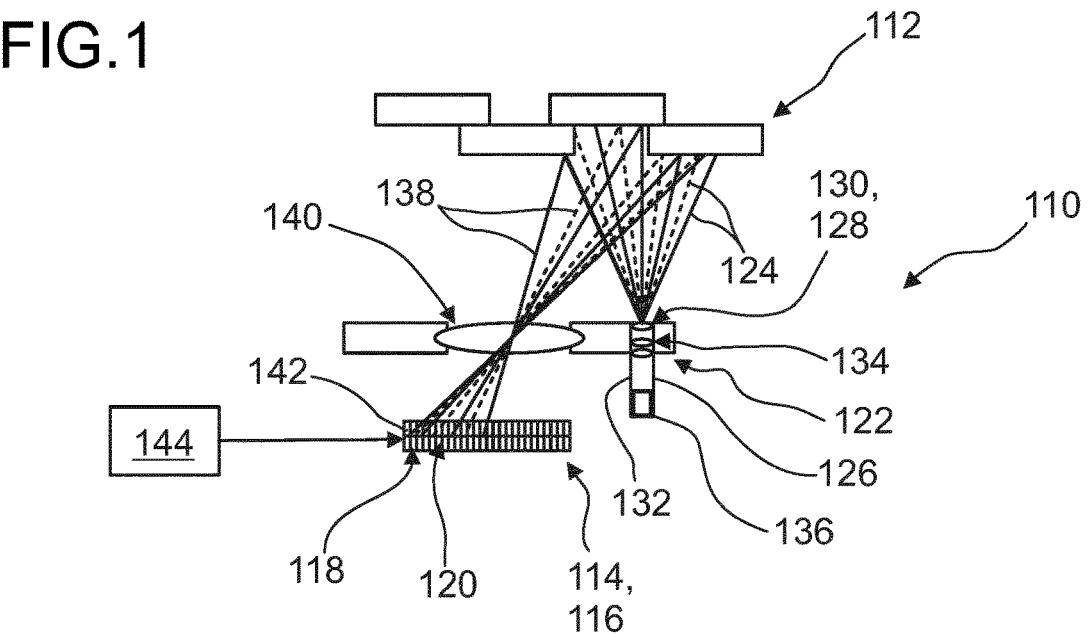
FIG. 1 shows an embodiment of a detector according to the present invention.

FIG. 1 shows in a highly schematic fashion a first embodiment of a detector 110 for determining a position of at least one object 112. The detector 110 comprises at least one sensor element 114 having a matrix 116 of optical sensors 118. The optical sensors 118 each have a light-sensitive area 120.

The sensor element 114 may be formed as a unitary, single device or as a combination of several devices. The matrix 116 specifically may be or may comprise a rectangular matrix having one or more rows and one or more columns. The rows and columns specifically may be arranged in a rectangular fashion. However, other arrangements are feasible, such as nonrectangular arrangements. As an example, circular arrangements are also feasible, wherein the elements are arranged in concentric circles or ellipses about a center point. For example, the matrix 116 may be a single row of pixels. Other arrangements are feasible.

The optical sensors 118 of the matrix 116 specifically may be equal in one or more of size, sensitivity and other optical, electrical and mechanical properties. The light-sensitive areas 120 of all optical sensors 118 of the matrix 116 specifically may be located in a common plane, the common plane preferably facing the object 112, such that a light beam propagating from the object to the detector 110 may generate a light spot on the common plane. The light-sensitive area 120 may specifically be located on a surface of the respective optical sensor 118. Other embodiments, however, are feasible.

The optical sensors 118 may comprise for example, at least one CCD and/or CMOS device. As an example, the optical sensors 118 may be part of or constitute a pixelated optical device. As an example, the optical sensors may be part of or constitute at least one CCD and/or CMOS device having a matrix of pixels, each pixel forming a light-sensitive area 120. Preferably the detector is configured such that the optical sensors 118 are exposed simultaneously within a certain time period, denoted as frame or imaging frame. For example, the optical sensors 118 may be part of or constitute at least one global shutter CMOS.

The optical sensors 118 specifically may be or may comprise photodetectors, preferably inorganic photodetectors, more preferably inorganic semiconductor photodetectors, most preferably silicon photodetectors. Specifically, the optical sensors 118 may be sensitive in the infrared spectral range. All of the optical sensors 118 of the matrix 116 or at least a group of the optical sensors 118 of the matrix 116 specifically may be identical. Groups of identical optical sensors 118 of the matrix 116 specifically may be provided for different spectral ranges, or all optical sensors may be identical in terms of spectral sensitivity. Further, the optical sensors 118 may be identical in size and/or with regard to their electronic or optoelectronic properties. The matrix 116 may be composed of independent optical sensors 118. Thus, a matrix 116 may be composed of inorganic photodiodes. Alternatively, however, a commercially available matrix may be used, such as one or more of a CCD detector, such as a CCD detector chip, and/or a CMOS detector, such as a CMOS detector chip.

The optical sensors 118 may form a sensor array or may be part of a sensor array, such as the above-mentioned matrix. Thus, as an example, the detector 110 may comprise an array of optical sensors 118, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that $0.3 \leq m/n \leq 3$, such as by choosing m/n=1:1, 4:3, 16:9 or similar. As an example, the array may be a square array, having an equal number of rows and columns, such as by choosing m=2, n=2 or m=3, n=3 or the like.

The matrix 116 specifically may be a rectangular matrix having at least one row, preferably a plurality of rows, and a plurality of columns. As an example, the rows and columns may be oriented essentially perpendicular. In order to provide a wide range of view, the matrix 116 specifically may have at least 10 rows, preferably at least 50 rows, more preferably at least 100 rows. Similarly, the matrix may have at least 10 columns, preferably at least 50 columns, more preferably at least 100 columns. The matrix 116 may comprise at least 50 optical sensors 118, preferably at least 100 optical sensors 118, more preferably at least 500 optical sensors 118. The matrix 116 may comprise a number of pixels in a multi-mega pixel range. Other embodiments, however, are feasible.

The detector 110 further comprises a projector 122 for illuminating the object 112 with at least two illumination patterns 124. The projector 122 comprises at least one tunable laser source 126, in particular for generating at least one light beam. The projector 122 comprises the at least one diffractive optical element 128, in particular for generating and/or forming the illumination pattern 124 from the light beam of the tunable laser source 126. The projector 122 may be configured such that the illumination patterns 124 propagate from the projector 122, in particular from at least one opening 130 of a housing of the projector 122, towards the object 112. Additionally, an additional illumination pattern may be generated by at least one ambient light source. The projector 122 is configured to generate at least two illumination patterns 124 each comprising a plurality of illumination features. The projector 122 may be configured to project two, three, four, five or more illumination patterns each comprising a plurality of illumination features. The illumination patterns 124 may differ, specifically in one or more of number of illumination features, arrangement of illumination features, shape of illumination features, wavelength of illumination features, intensity of illumination features, opening angle and the like. In the embodiment of FIG. 1, the projector 122 may be configured to project two illumination patterns 124 onto the object 112, specifically with large variations in wavelength. This may allow covering different areas with the illumination features.

Each of the illumination patterns 124 may comprise at least one pattern selected from the group consisting of: at least one point pattern, in particular a pseudo-random point pattern; a random point pattern or a quasi random pattern; at least one Sobol pattern; at least one quasiperiodic pattern; at least one pattern comprising at least one pre-known feature at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines. For example, the projector 122 may be configured to generate and/or to project a cloud of points. For example, the projector 122 may be configured to generate a cloud of points such that the illumination patterns 124 may comprise a plurality of point features. The projector 122 may comprise the diffractive optical element configured to generate the illumination patterns 124 from at least one light beam generated by the tunable laser source 126. For example, each of the illumination patterns 124 may comprise at least one line. For example, the tunable laser source 126 may comprise at least one line laser. The line laser may be configured to send a laser line to the object, for example a horizontal or vertical laser line. For example, the projector 122 may comprise at least two tunable line lasers, or one tunable line laser and a non-tunable line laser, which may be arranged such that each of the illumination patterns 124 comprises at least two parallel or crossing lines.

The illumination patterns may comprise regular and/or constant and/or periodic patterns such as a triangular pattern, a rectangular pattern, a hexagonal pattern, or a pattern comprising further convex tilings. The illumination patterns may comprise as many features per area as possible such that a hexagonal pattern may be preferred. A distance between two features of the respective illumination pattern and/or an area of the at least one illumination feature may depend on a circle of confusion in an image determined by at least one optical sensor as described below.

The illumination pattern 124 generated and/or formed by the DOE 128 may be wavelength dependent. Specifically, the illumination patterns 124 generated and/or formed by the DOE 128 may be interference patterns 124 which is strongly wavelength dependent.

For example, the tunable laser source 126 may comprise one or more of a semiconductor tunable laser, a Sample Grating Distributed Bragg Reflector laser (SG-DBR), an external cavity laser, for example using a (Micro Electro Mechanical System) MEMS structure, a diode laser, a vertical cavity surface-emitting laser (VCSEL), a vertical cavity surface-emitting laser array, a distributed feedback laser, or the like. The tunable laser source may be tunable over a wavelength range from 350 to 1500 nm, preferably from 400 to 1100 nm, more preferably from 700 to 1000 nm, most preferably from 980-770 nm. Examples for tunable laser sources 126 can be found e.g. in https://en.wikipedia.org/wiki/Tunable_laser. The tunable laser source 126 may comprise a driver, specifically a tunable driver. The tunable laser source 126 may comprise focusing optics 134. The projector 122 may comprise a plurality of tunable laser sources 126.

The projector 122 comprises at least one control unit 136. The control unit 136 is configured for controlling at least one property of the tunable laser source 126. The at least one property of the tunable laser source 126 may be at least one property selected from the group consisting of a voltage, a current, a temperature, an emission wavelength, an intensity and the like. For example, the emission wavelength of the tunable laser source 126 may be adjustable by one or more of varying a driver current, changing a MEMS state, changing the modulation of an electrooptical or an acousto-optical modulator or the like. In particular, the emission wavelength of the coherent light emitted by the tunable laser source 126 may depend on the driver current by which the tunable laser source is driven and/or the temperature. The projector 122 is configured to generate the at least two illumination patterns 124 by controlling the at least one property of the tunable laser source 126. As the illumination pattern 124 generated and/or formed by the DOE 128 is strongly wavelength dependent, when the emission wavelength changes the illumination pattern 124 changes, too.

The control unit 136 may be configured to control the at least one property of the tunable laser source 126 by applying an electrical signal to the tunable laser source 126. For example, the control unit 136 may be configured to vary the driver current and/or to change the MEMS state and/or to change the modulation of an electro-optical or acousto-optical modulator or the like.

The control unit 136 may comprise at least one processing device, in particular at least one processor and/or at least one application-specific integrated circuit (ASIC). The control unit 136 may comprise one or more programmable devices such as one or more computers, application-specific integrated circuits (ASICs), Digital Signal Processors (DSPs), or Field Programmable Gate Arrays (FPGAs) which are configured to perform the controlling of the tunable laser source 126. The control unit 136 may comprise at least one processing device having a software code stored thereon comprising a number of computer commands. The control unit 136 may provide one or more hardware elements for performing controlling the tunable laser source 126 and/or may provide one or more processors with software running thereon for performing controlling of the tunable laser source. The control unit 136 may be configured to issue and/or to generate at least one electronic signal for controlling the tunable laser source. The control unit 136 may have one or more wireless and/or wire-bound interfaces and/or other types of control connections for controlling the tunable laser source 126. The control unit 136 and the tunable laser source may be interconnected by one or more connectors and/or by one or more interfaces.

The tunable laser source 126 may be configured for emitting light in the infrared spectral range. It shall be noted, however, that other spectral ranges are feasible, additionally or alternatively. Further, the projector 122 specifically may be configured for emitting modulated or non-modulated light. In case a plurality of tunable laser sources 126 is used, the different tunable laser sources 126 may have different modulation frequencies which later on may be used for distinguishing the light beams, specifically the respective illumination pattern.

The projector 122 may be operable in at least two emission modes. The emission mode may be adjusted by setting and/or adjusting the property of an emission light beam of the tunable laser source 126. The control unit 136 may be configured to adjust the emission mode by applying an electrical signal to the tunable laser source 126. For example, in a first emission mode the tunable laser source 126 may have a first emission wavelength $\lambda_1$ and in a second emission mode the tunable laser source 126 may have a second emission wavelength $\lambda_2$ different from the first emission wavelength $\lambda_1$. The emission wavelength of the tunable laser source 126 may be adjustable by one or more of varying the driver current, changing the MEMS state, changing the modulation of the electro-optical or acousto-optical modulator or the like. The control unit 136 may be configured to adjust the emission wavelength in steps or continuously. The projector 122 may be configured to project the two illumination patterns 124 to at least partly differing locations. The control unit 136 may be configured to adjust the emission wavelength in steps or continuously thereby adjusting the location of the illumination patterns 124. By adjusting the emission wavelength the illumination pattern a position of the illumination features of the illumination pattern 124 such as of light spots may change on the object 112. Usually, in projectors for structured light measurements changes in wavelength are strictly avoided to ensure stable measurements. However, in case of the depth from photon ratio technique where the measurement relies on single points only, it is desirable to project point patterns to differing locations with a simple setup. The movement of the illumination feature on the object 112 may be small compared to the distance between two illumination features. The control unit 136 may be configured to adjust the emission wavelength in steps, wherein the step size is within a range from 0.001 to 5 nm, preferably within a range from 0.01 to 0.5 nm, most preferably within a range from 0.05 to 0.15 nm. Such a small step size may allow shifting the illumination pattern according to a 2D-picture of a sensor element 114 in order to illuminate a certain region of the object 112.

The at least two emission wavelengths of the tunable laser source 126 may be clearly separated and stable. Separation may ensure that the DOE 128 can be designed for two well specified wavelengths. The first emission wavelength $\lambda_1$ and the second emission wavelength $\lambda_2$ may be separable. The first emission wavelength $\lambda_1$ and the second emission wavelength $\lambda_2$ may differ by 40 nm$\geq|\lambda_1-\lambda_2|\geq$1 nm, preferably by 30 nm$\geq|\lambda_1-\lambda_2|\geq$2.5 nm, more preferably by 20 nm$\geq|\lambda_1-\lambda_2|\geq$4 nm. The first emission wavelength $\lambda_1$ and the second emission wavelength $\lambda_2$ are stable. Stability may be important concerning a variation around the emission wavelength as this may vary the illumination pattern or features of the pattern in an undesired way. Variations in wavelength $\Delta\lambda$ may be small compared to the wavelength, wherein $\Delta\lambda\leq$1.5%, preferably $\Delta\lambda\leq$0.5%, more preferably $\Delta\lambda\leq$0.1%. Moreover, well specified emission wavelengths and stability may be desired for triangulation based depth from photon ratio measurements such as described in international patent application PCT/EP2018/073067 filed on Aug. 28, 2018, the content of which is included by reference, where a correspondence between the electronic signal determining the emission mode and the illumination pattern 124 is necessary for a clearly defined and known reference pattern in order to allow a reliable comparison of a reflection image, specifically a reflection pattern 138, with the reference pattern.

The emission modes may differ in intensity. This may improve a dynamic range of the measurement. As an example, a dark object may be measured in a high intensity emission mode. A bright object may be measured in a low intensity emission mode.

The illumination patterns 124 generated in different emission modes may have different opening angles. The opening angles of two patterns may differ by 0.5° or more, preferably by 1.5° or more, more preferably by 2.5° or more. Thus, a measurable field of view may be changed by changing the emission mode.

A minimal distance where the diffractive optical element 128 generates the illumination patterns 124 may change upon changing the emission mode. Thus, the emission mode change may also allow changing the measurement range of the detector 110.

The tunable laser source 126 may be configured to generate at least one light pulse. The light pulse may be a non-continuous light beam having a certain pulse length. The light pulse may comprise at least one beam profile. The light beam may have a spatial extension. Specifically, the light beam may have a non-Gaussian beam profile. The beam profile may be selected from the group consisting of a trapezoid beam profile; a triangle beam profile; a conical beam profile. The trapezoid beam profile may have a plateau region and at least one edge region. The light beam may be a Gaussian light beam or a linear combination of Gaussian light beams. The beam profile may be a transverse intensity profile of the light beam. The beam profile may be a cross section of the light beam. The beam profile may be selected from the group consisting of a trapezoid beam profile; a triangle beam profile; a conical beam profile and a linear combination of Gaussian beam profiles. Other embodiments are feasible, however. The projector 122 may comprise at least one transfer device 140 which may be configured for one or more of adjusting, defining and determining the beam profile, in particular a shape of the beam profile. The control unit 136 may be configured to adjust a wavelength of the light pulse such that the wavelength within the beam profile of the light pulse varies by a wavelength variation $\Delta\Lambda$ by applying an electrical signal to the tunable laser source 126 and/or to adjust wavelengths of light pulses of a series of light pulses such that the wavelengths of at least two light pulses of the series of light pulses vary by the wavelength variation $\Delta\Lambda$. The wavelength of the light pulse may be adjustable by one or more of varying a driver current, changing a MEMS state, changing the modulation of an electro-optical or acousto-optical modulator or the like. The wavelength may be varied within the light pulse or within a series of pulses. Thereby, the position of the projected illumination feature, e.g. of a light spot, will slightly move on the object as described above. The movement of one of the illumination feature may be small compared to the distance between adjacent illumination features. The wavelength variation $\Delta\Lambda$ may be small compared to the wavelength. For example, the wavelength variation may be within a range of $0.01\% \leq |\Delta\Lambda| \leq 10\%$, preferably $0.02\% \leq |\Delta\Lambda| \leq 2\%$, more preferably $0.075\% \leq |\Delta\Lambda| \leq 0.75\%$. The light pulse or series of light pulses may preferably be within a single frame recording of the sensor element 114. Preferably a global shutter CMOS may be used. Usage of laser sources generally may lead to speckles in the beam profile recorded by the sensor element. The wavelength variation may result in that the sensor element records an average of the speckle pattern while the movement of the illumination features may be almost unnoticed. Thus, the tunable laser source 126 itself may average the speckles without giving up its coherence and without use of speckle reducing optical elements. This may allow reducing dependence of the distance measurement on surface roughness and generally increases measurement accuracy.

Each optical sensor 118 is designed to generate at least one sensor signal in response to an illumination of its respective light-sensitive area 120 by a reflection light beam propagating from the object 112 to the detector 110. Furthermore, the sensor element 114 is configured to determine at least one reflection image 142. The matrix 116 may comprise the reflection image 142. The reflection image 142 may comprise points as reflection features. These points result from reflection light beams 125 originating from the object 112.

The detector 110 may comprise the at least one transfer device 140 comprising one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system. In particular, the transfer device 110 may comprise at least one collimating lens configured to focus at least one object point in an image plane.

The detector 110 comprises at least one evaluation device 144. The evaluation device 144 is configured to select at least one reflection feature of the reflection image 142. The evaluation device 144 may be configured to perform at least one image analysis and/or image processing in order to identify the reflection feature. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing an object within an image generated by the optical sensors 118.

The evaluation device 144 is configured for determining at least one longitudinal coordinate z of the selected reflection feature of the reflection image 142 by evaluating a combined signal Q from the sensor signals. The evaluation device 144 may be configured for deriving the combined signal Q by one or more of dividing the sensor signals, dividing multiples of the sensor signals, dividing linear combinations of the sensor signals. The evaluation device 144 may be configured for using at least one predetermined relationship between the combined signal Q and the longitudinal region for determining the longitudinal region. For example, the evaluation device 144 may be configured for deriving the combined signal Q by $$Q(z_O) = \frac{\iint_{A_1} E(x, y; z_O) dx dy}{\iint_{A_2} E(x, y; z_O) dx dy}$$

wherein x and y are transversal coordinates, A1 and A2 are different areas of at least one beam profile of the reflection light beam at the sensor position, and $E(x,y,z_o)$ denotes the beam profile given at the object distance $z_o$. Area A1 and area A2 may differ. In particular, A1 and A2 are not congruent. Thus, A1 and A2 may differ in one or more of the shape or content. The beam profile may be a transverse intensity profile of the light beam. The beam profile may be a cross section of the light beam. The beam profile may be selected from the group consisting of a trapezoid beam profile; a triangle beam profile; a conical beam profile and a linear combination of Gaussian beam profiles. Generally the beam profile is dependent on luminance $L(z_o)$ and beam shape $S(x,y;z_o)$, $E(x,y;z_o)=L \cdot S$. Thus, by deriving the combined signal it may allow determining the longitudinal coordinate independent from luminance. In addition, using the combined signal allows determination of the distance $z_o$ independent from the object size. Thus, the combined signal allows determination of the distance $z_o$ independent from the material properties and/or reflective properties and/or scattering properties of the object and independent from alterations of the light source such as by manufacturing precision, heat, water, dirt, damages on the lens, or the like.

Each of the sensor signals may comprise at least one information of at least one area of the beam profile of the light beam. The light-sensitive areas 120 may be arranged such that a first sensor signal comprises information of a first area of the beam profile and a second sensor signal comprises information of a second area of the beam profile. The first area of the beam profile and second area of the beam profile may be one or both of adjacent or overlapping regions. The first area of the beam profile and the second area of the beam profile may be not congruent in area.

The evaluation device 144 may be configured to determine and/or to select the first area of the beam profile and the second area of the beam profile. The first area of the beam profile may comprise essentially edge information of the beam profile and the second area of the beam profile may comprise essentially center information of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. Preferably, the center information has a proportion of edge information of less than 10%, more preferably of less than 5%, most preferably the center information comprises no edge content. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region. The first area of the beam profile may be area A2 and the second area of the beam profile may be area A1. Similarly, the center signal and edge signal may also be determined by using segments of the beam profile such as circular segments of the beam profile. For example, the beam profile may be divided into two segments by a secant or a chord that does not pass the center of the beam profile. Thus, one segment will essentially contain edge information, while the other segment will contain essentially center information. For example, to further reduce the amount of edge information in the center signal, the edge signal may further be subtracted from the center signal.

The edge information may comprise information relating to a number of photons in the first area of the beam profile and the center information may comprise information relating to a number of photons in the second area of the beam profile. The evaluation device 144 may be configured for determining an area integral of the beam profile. The evaluation device 144 may be configured to determine the edge information by integrating and/or summing of the first area. The evaluation device 144 may be configured to determine the center information by integrating and/or summing of the second area. For example, the beam profile may be a trapezoid beam profile and the evaluation device may be configured to determine an integral of the trapezoid.

Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device 144 may be configured to determine one or both of center information or edge information from at least one slice or cut of the light spot. This may be realized, for example, by replacing the area integrals in the combined signal Q by a line integral along the slice or cut. For improved accuracy, several slices or cuts through the light spot may be used and averaged. In case of an elliptical spot profile, averaging over several slices or cuts may result in improved distance information.

For example, the evaluation device 144 may be configured for evaluating the sensor signals, by
 a) determining at least one optical sensor 118 having the highest sensor signal and forming at least one center signal;
 b) evaluating the sensor signals of the optical sensors 118 of the matrix 116 and forming at least one sum signal;
 c) determining at least one combined signal by combining the center signal and the sum signal; and
 d) determining the at least one longitudinal coordinate z of the selected feature by evaluating the combined signal.

For example, the center signal may be the signal of the at least one optical sensor 116 having the highest sensor signal out of the plurality of sensor signals generated by the optical sensors 118 of the entire matrix 116 or of a region of interest within the matrix 116, wherein the region of interest may be predetermined or determinable within an image generated by the optical sensors of the matrix 116. The center signal may arise from a single optical sensor 118 or from a group of optical sensors 118, wherein, in the latter case, as an example, the sensor signals of the group of optical sensors 118 may be added up, integrated or averaged, in order to determine the center signal. The group of optical sensors 118 from which the center signal arises may be a group of neighboring optical sensors, such as optical sensors 118 having less than a predetermined distance from the actual optical sensor having the highest sensor signal, or may be a group of optical sensors generating sensor signals being within a predetermined range from the highest sensor signal. The group of optical sensors 118 from which the center signal arises may be chosen as large as possible in order to allow maximum dynamic range. The evaluation device 144 may be configured to determine the center signal by integration of the plurality of sensor signals, for example the plurality of optical sensors around the optical sensor having the highest sensor signal.

The determination of the center signal may be performed electronically, since a comparison of sensor signals is fairly simply implemented by conventional electronics, or may be performed fully or partially by software. The detection of the center of the light spot, i.e. the detection of the center signal and/or of the at least one optical sensor from which the center signal arises, may be performed fully or partially electronically or fully or partially by using one or more software algorithms. Specifically, the evaluation device 144 may comprise at least one center detector for detecting the at least one highest sensor signal and/or for forming the center signal. The center detector specifically may fully or partially be embodied in software and/or may fully or partially be embodied in hardware. The center detector may fully or partially be integrated into the at least one sensor element and/or may fully or partially be embodied independently from the sensor element.

Specifically, the center signal may be selected from the group consisting of: the highest sensor signal; an average of a group of sensor signals being within a predetermined range of tolerance from the highest sensor signal; an average of sensor signals from a group of optical sensors containing the optical sensor 118 having the highest sensor signal and a predetermined group of neighboring optical sensors 118; a sum of sensor signals from a group of optical sensors 118 containing the optical sensor 118 having the highest sensor signal and a predetermined group of neighboring optical sensors 118; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors 118 containing the optical sensor 118 having the highest sensor signal and a predetermined group of neighboring optical sensors; an integral of a group of sensor signals being within a predetermined range of tolerance from the highest sensor signal; an integral of a group of sensor signals being above a predetermined threshold.

For example, the sum signal may be derived by adding up the sensor signals, integrating over the sensor signals or averaging over the sensor signals of the entire matrix 116 or of a region of interest within the matrix, wherein the region of interest may be predetermined or determinable within an image generated by the optical sensors 118 of the matrix 116. When adding up, integrating over or averaging over the sensor signals, the actual optical sensors 118 from which the sensor signal is generated may be left out of the adding, integration or averaging or, alternatively, may be included into the adding, integration or averaging. The evaluation device 144 may be configured to determine the sum signal by integrating signals of the entire matrix 116, or of the region of interest within the matrix 116. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

The sum signal may be derived from all sensor signals of the matrix 116, from the sensor signals within a region of interest or from one of these possibilities with the sensor signals arising from the optical sensors 118 contributing to the center signal excluded. In every case, a reliable sum signal may be generated which may be compared with the center signal reliably, in order to determine the longitudinal coordinate. Generally, the sum signal may be selected from the group consisting of: an average over all sensor signals of the matrix 116; a sum of all sensor signals of the matrix 116; an integral of all sensor signals of the matrix 116; an average over all sensor signals of the matrix 116 except for sensor signals from those optical sensors 118 contributing to the center signal; a sum of all sensor signals of the matrix 116 except for sensor signals from those optical sensors 118 contributing to the center signal; an integral of all sensor signals of the matrix 116 except for sensor signals from those optical sensors 118 contributing to the center signal; a sum of sensor signals of optical sensors 118 within a predetermined range from the optical sensor having the highest sensor signal; an integral of sensor signals of optical sensors within a predetermined range from the optical sensor 118 having the highest sensor signal; a sum of sensor signals above a certain threshold of optical sensors being located within a predetermined range from the optical sensor 118 having the highest sensor signal; an integral of sensor signals above a certain threshold of optical sensors 118 being located within a predetermined range from the optical sensor 118 having the highest sensor signal. Other options, however, exist. The summing may be performed fully or partially in software and/or may be performed fully or partially in hardware. A summing is generally possible by purely electronic means which, typically, may easily be implemented into the detector. Thus, in the art of electronics, summing devices are generally known for summing two or more electrical signals, both analogue signals and digital signals. Thus, the evaluation device 144 may comprise at least one summing device for forming the sum signal. The summing device may fully or partially be integrated into the sensor element or may fully or partially be embodied independently from the sensor element. The summing device may fully or partially be embodied in one or both of hardware or software.

The combined signal may be a signal which is generated by combining the center signal and the sum signal. Specifically, the combination may include one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa. Additionally or alternatively, the combined signal may comprise an arbitrary signal or signal combination which contains at least one item of information on a comparison between the center signal and the sum signal. The evaluation device 144 may be configured to determine the at least one longitudinal coordinate z of the object by using at least one known, determinable or predetermined relationship between the sensor signals. In particular, the evaluation device 144 may be configured to determine the at least one coordinate z of the by using at least one known, determinable or predetermined relationship between a quotient signal derived from the sensor signals and the longitudinal coordinate.

The comparison between the center signal and the sum signal specifically may be performed by forming one or more quotient signals. Thus, generally, the combined signal may be a quotient signal Q, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa; forming a quotient of the center signal and a linear combination of the sum signal and the center signal or vice versa; forming a quotient of the sum signal and a linear combination of the sum signal and the center signal or vice versa; forming a quotient of an exponentiation of the center signal and an exponentiation of the sum signal or vice versa. Other options, however, exist. The evaluation device 144 may be configured for forming the one or more quotient signals. The evaluation device 144 may further be configured for determining the at least one longitudinal coordinate by evaluating the at least one quotient signal.

The evaluation device 144 specifically may be configured for using at least one predetermined relationship between the combined signal Q and the longitudinal coordinate, in order to determine the at least one longitudinal coordinate. Thus, due to the reasons disclosed above and due to the dependency of the properties of the light spot on the longitudinal coordinate, the combined signal Q typically is a monotonous function of the longitudinal coordinate of the object and/or of the size of the light spot such as the diameter or equivalent diameter of the light spot. Thus, as an example, specifically in case linear optical sensors are used, a simple quotient of the sensor signal $s_{center}$ and the sum signal $s_{sum}$ $Q=s_{center}/s_{sum}$ may be a monotonously decreasing function of the distance. Without wishing to be bound by this theory, it is believed that this is due to the fact that, in the preferred setup described above, both the center signal $s_{center}$ and the sum signal $s_{sum}$ decrease as a square function with increasing distance to the light source, since the amount of light reaching the detector decreases. Therein, however, the center signal $s_{center}$ decreases more rapidly than the sum signal $s_{sum}$, since, in the optical setup as used in the experiments, the light spot in the image plane grows and, thus, is spread over a larger area. The quotient of the center signal and the sum signal, thus, continuously decreases with increasing diameter of the light beam or diameter of the light spot on the light-sensitive areas of the optical sensors of the matrix. The quotient, further, is typically independent from the total power of the light beam, since the total power of the light beam forms a factor both in the center signal and in the sum sensor signal. Consequently, the combined signal Q may form a secondary signal which provides a unique and unambiguous relationship between the center signal and the sum signal and the size or diameter of the light beam. Since, on the other hand, the size or diameter of the light beam is dependent on a distance between the object, from which the light beam propagates towards the detector, and the detector itself, i.e. dependent on the longitudinal coordinate of the object, a unique and unambiguous relationship between the center signal and the sum signal on the one hand and the longitudinal coordinate on the other hand may exist. For the latter, reference e.g. may be made to one or more of the above-mentioned prior art documents, such as WO 2014/097181 A1. The predetermined relationship may be determined by analytical considerations, such as by assuming a linear combination of Gaussian light beams, by empirical measurements, such as measurements measuring the combined signal and/or the center signal and the sum signal or secondary signals derived thereof as a function of the longitudinal coordinate of the object, or both.

The evaluation device 144 may be configured for using at least one predetermined relationship between the combined signal and the longitudinal coordinate. The predetermined relationship may be one or more of an empiric relationship, a semi-empiric relationship and an analytically derived relationship. The evaluation device 144 may comprise at least one data storage device for storing the predetermined relationship, such as a lookup list or a lookup table.

The sensor element 114 may be configured to determine the reflection pattern 138. The reflection pattern may comprise at least one feature corresponding to at least one feature of the illumination pattern 124. The reflection pattern 138 may comprise, in comparison to the illumination pattern, at least one distorted pattern, wherein the distortion depends on the distance of the object, such as surface properties of the object. The evaluation device 144 may be configured to select at least one feature of the reflection pattern and to determine the longitudinal coordinate of the selected feature of the reflection pattern by evaluating the combined signal Q from the sensor signals, as described above. Thus, the detector 110 may be configured to pre-classify the at least one reflection feature of the reflection image 142. This allows using illumination patterns 124 comprising regular and/or constant and/or periodic pattern such as a triangular pattern, a rectangular pattern, a hexagonal pattern or a pattern comprising further convex tilings.

The evaluation device 144 may be configured to determine a longitudinal region of the selected reflection feature by evaluating the combined signal Q, wherein the longitudinal region is given by the longitudinal coordinate z and an error interval ±ε. Error E may depend on measurement uncertainty of the optical sensor 118. The measurement uncertainty of the optical sensors 118 may be pre-determined and/or estimated and/or may be deposited in at least one data storage unit of the evaluation device 144. For example, the error interval may be ±10%, preferably ±5%, more preferably ±1%.

The evaluation device 144 may be configured to determine at least one displacement region in at least one reference image corresponding to the longitudinal region. The reference image may be an image different from the reflection image which is determined at a different spatial position compared to the reflection image 142. The reference image may be determined by one or more of recording at least one reference feature, imaging the at least one reference feature, calculating of the reference image. The reference image and the reflection image may be images of the object determined at different spatial positions having a fixed distance. The distance may be a relative distance, also called baseline. The evaluation device 144 may be configured to determine the at least one reference feature in the at least one reference image corresponding to the at least one reflection feature. The evaluation device 144 may be configured to perform an image analysis and to identify features of the reflection image 142. The evaluation device 144 may be configured to identify at least one reference feature in the reference image having an essentially identical longitudinal coordinate as the selected reflection feature. The reference feature corresponding to the reflection feature may be determined using epipolar geometry. For description of epipolar geometry reference is made, for example, to chapter 2 in X. Jiang, H. Bunke: "Dreidimensionales Computersehen" Springer, Berlin Heidelberg, 1997. Epipolar geometry may assume that the reference image and the reflection image 142 may be images of the object determined at different spatial positions and/or spatial orientations having a fixed distance. The reference image and the reflection image 142 may be images of the object 112 determined at different spatial positions having a fixed distance. The evaluation device 144 may be configured to determine an epipolar line in the reference image. Relative position of the reference image and reflection image may be known. For example, relative position of the reference image and reflection image 142 may be stored within at least one storage unit of the evaluation device 144. The evaluation device 144 may be configured to determine a straight line extending from the selected reflection feature of the reflection image 142. The straight line may comprise possible object features corresponding to the selected feature. The straight line and the baseline span an epipolar plane. As the reference image is determined at a different relative position from the reflection image, the corresponding possible object features may be imaged on a straight line, called epipolar line, in the reference image. Thus, a feature of the reference image corresponding to the selected feature of the reflection image lies on the epipolar line. Due to distortions of the image or changes in the system parameters such as due to ageing, temperature changes, mechanical stress or the like, epipolar lines may intersect or be very close to each other and/or the correspondence between reference feature and reflection feature may be unclear. Further, each known position or object in the real world may be projected onto the reference image and vice versa. The projection may be known due to a calibration of the detector 110, whereas the calibration is comparable to a teach-in of the epipolar geometry of the specific camera.

Specifically, the displacement region may be a region in the reference image in which the reference feature corresponding to the selected reflection feature is expected to be located in the reference image. Depending on the distance to the object 112, an image position of the reference feature corresponding to the reflection feature may be displaced within the reference image compared to an image position of the reflection feature in the reflection image. The displacement region may comprise only one reference feature. The displacement region may also comprise more than one reference feature. The displacement region may comprise an epipolar line or a section of an epipolar line. The displacement region may comprise more than one epipolar line or more sections of more than one epipolar line. The displacement region may extend along the epipolar line, orthogonal to an epipolar line, or both. The evaluation device 144 may be configured to determine the reference feature along the epipolar line corresponding to the longitudinal coordinate z and to determine an extent of the displacement region along the epipolar line corresponding to the error interval ±ε or orthogonal to an epipolar line. The measurement uncertainty of the distance measurement using the combined signal Q may result in a displacement region which is non-circular since the measurement uncertainty may be different for different directions. Specifically, the measurement uncertainty along the epipolar line or epipolar lines may be greater than the measurement uncertainty in an orthogonal direction with respect to the epipolar line or epipolar lines. The displacement region may comprise an extent in an orthogonal direction with respect to the epipolar line or epipolar lines. The evaluation device may determine a displacement region around the image position of the reflection feature. The evaluation device 144 may be configured to determine the longitudinal coordinate z for the reflection feature and an error interval ±ε from the combined signal Q to determine the displacement region along the epipolar line corresponding to z±ε. The evaluation device may be configured to match the selected reflection feature with at least one reference feature within the displacement region. As used herein, the term "matching" refers to determining and/or evaluating corresponding reference and reflection features. The evaluation device 144 may be configured to match the selected feature of the reflection image with the reference feature within the displacement region by using at least one evaluation algorithm considering the determined longitudinal coordinate z. The evaluation algorithm may be a linear scaling algorithm. The evaluation device 144 may be configured to determine the epipolar line closest to and/or within the displacement region. The evaluation device 144 may be configured to determine the epipolar line closest to the image position of the reflection feature. The extent of the displacement region along the epipolar line may be larger than the extent of the displacement region orthogonal to the epipolar line. The evaluation device 144 may be configured to determine an epipolar line before determining a corresponding reference feature. The evaluation device 144 may determine a displacement region around the image position of each reflection feature. The evaluation device 144 may be configured to assign an epipolar line to each displacement region of each image position of the reflection features, such as by assigning the epipolar line closest to a displacement region and/or within a displacement region and/or closest to a displacement region along a direction orthogonal to the epipolar line. The evaluation device 144 may be configured to determine the reference feature corresponding to the image position of the reflection feature by determining the reference feature closest to the assigned displacement region and/or within the assigned displacement region and/or closest to the assigned displacement region along the assigned epipolar line and/or within the assigned displacement region along the assigned epipolar line.

Additionally or alternatively, the evaluation device 144 may be configured to perform the following steps:
  Determining the displacement region for the image position of each reflection feature;
  Assigning an epipolar line to the displacement region of each reflection feature such as by assigning the epipolar line closest to a displacement region and/or within a displacement region and/or closest to a displacement region along a direction orthogonal to the epipolar line;
  Assigning and/or determining at least one reference feature to each reflection feature such as by assigning the reference feature closest to the assigned displacement region and/or within the assigned displacement region and/or closest to the assigned displacement region along the assigned epipolar line and/or within the assigned displacement region along the assigned epipolar line.

Additionally or alternatively, the evaluation device 144 may be configured to decide between more than one epipolar line and/or reference feature to be assigned to a reflection feature such as by comparing distances of reflection features and/or epipolar lines within the reference image and/or by comparing error weighted distances, such as e-weighted distances of reflection features and/or epipolar lines within the reference image and assigning the epipolar line and/or reference feature in shorter distance and/or e-weighted distance to the reference feature and/or reflection feature.

Preferably, the detector 110 may be configured to preclassify the selected reflection feature using the combined signal Q such that an unambiguous assignment to one reference feature is possible. In particular, illumination features of the illumination pattern 124 may be arranged such that corresponding reference features of the reference image may have a relative distance to each other as large as possible on the epipolar line. The illumination features of the illumination pattern 124 may be arranged such that only few reference features are positioned on the epipolar line. For example, the illumination pattern 124 may comprise at least one hexagonal pattern. Preferably, the illumination pattern 124 may comprise at least one hexagonal pattern, wherein the pattern is rotated relative to the baseline. Preferably, the illumination pattern 124 may comprise at least one displaced hexagonal pattern, wherein individual points of the hexagonal pattern are displaced by a random distance from the regular position, for example orthogonal to the epipolar line of the point. The displacement of the individual points may be smaller than half of the distance between two parallel epipolar lines, preferably smaller than one fourth of the distance between two parallel epipolar lines. The displacement of the individual points may be as such that two points are not displaced above each other.

The evaluation device 144 may be configured to determine a displacement of the matched reference feature and the selected reflection feature. The evaluation device 144 may be configured to determine a longitudinal information of the matched feature using a predetermined relationship between a longitudinal coordinate and the displacement. For example, the longitudinal information may be a distance value. The evaluation device 144 may be configured to determine the pre-determined relationship by using triangulation methods. In case position of the selected reflection feature in the reflection image and position of the matched reference feature and/or relative displacement of the selected reflection feature and the matched reference feature are known, longitudinal coordinate of the corresponding object feature may be determined by triangulation. Thus, the evaluation device 144 may be configured to select, for example subsequent and/or column by column, a reflection feature and to determine for each potential position of the reference feature the corresponding distance value using triangulation. Displacement and corresponding distance value may be stored in at least one storage device of the evaluation device 144. The evaluation device 144 may, as an example, comprise at least one data processing device, such as at least one processor, at least one DSP, at least one FPGA and/or at least one ASIC. Further, for storing the at least one predetermined or determinable relationship between the longitudinal coordinate z and the displacement, the at least one data storage device may be provided, such as for providing one or more look-up tables for storing the predetermined relationship. The evaluation device 144 may be configured to store parameters for an intrinsic and/or extrinsic calibration of the camera and/or the detector 110. The evaluation device 144 may be configured to generate the parameters for an intrinsic and/or extrinsic calibration of the camera and/or the detector such as by performing a Tsai camera calibration. The evaluation device 144 may be configured to compute and/or estimate parameters such as the focal length of the transfer device, the radial lens distortion coefficient, the coordinates of the center of radial lens distortion, scale factors to account for any uncertainty due to imperfections in hardware timing for scanning and digitization, rotation angles for the transformation between the world and camera coordinates, translation components for the transformation between the world and camera coordinates, aperture angles, image sensor format, principal point, skew coefficients, camera center, camera heading, baseline, rotation or translation parameters between camera and/or illumination source, apertures, focal distance, or the like.

Using the combined sensor signal allows to estimate distances, such as the longitudinal coordinate z within the error interval. By determining the displacement region corresponding to the estimated longitudinal coordinate and the corresponding error interval allows to reduce the possible number of solutions along the epipolar line significantly. The number of possible solutions may even be reduced to one. Determining of the longitudinal coordinate z and the error interval may be performed during a pre-evaluation before matching the selected reflection feature and reference feature. This may allow reducing the computational demand such that it is possible to significantly reduce costs and to allow a use in mobile device or outdoor devices. Furthermore, generally in triangulation systems the baseline has to be large in order to detect large distances. Pre-evaluation of the longitudinal coordinate z and error interval using the combined sensor signal and subsequent matching of the selected reflection feature and reference feature may allow using short baselines such that it may be possible to provide a compact device. Furthermore, pre-evaluation of the longitudinal coordinate z and error interval using the combined sensor signal and subsequent matching of the selected reflection feature and reference feature may enhance accuracy and/or speed and/or may lower computational demand in comparison to conventional triangulation systems. Further, the number of illumination features such as the number of illumination points in the illumination pattern may be reduced to increase the light intensity in each illumination point such as to compete with ambient light while complying to eye safety regulations. A reduced number of illumination features in a conventional triangulation system might increase the difficulty to match reflection features and reference features. Further, the number of illumination features such as the number of illumination points in the illumination pattern may be increased, such as to increase the resolution of the distance measurement, such as to increase the resolution of the obtained depth map without increasing the processing power of the evaluation device such as in a mobile application.

Figure 2A:
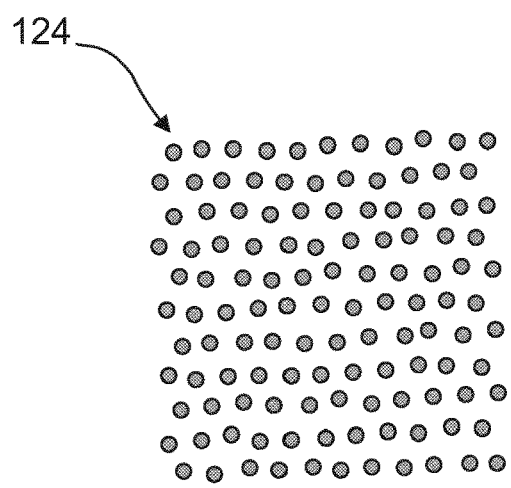
FIGS. 2A to 2C show an illumination pattern projected using a single wavelength (FIG. 2A), three illumination patterns projected using three wavelengths with small variations (FIG. 2B) and three illumination patterns projected using three wavelengths with larger variations (FIG. 2C)

FIG. 2A shows an illumination pattern 124 generated by the diffractive optical element 128 projected using a single wavelength. All spots may be projected at the same distance. The illumination pattern 124 may comprise at least one feature such as a point or symbol. The illumination pattern 124 may comprise a plurality of features. The illumination pattern 124 may comprise an arrangement of periodic or non-periodic features. In this embodiment, the illumination pattern 124 may comprise at least one randomized hexagonal pattern. The illumination pattern 124 may comprise as many features per area as possible such that hexagonal pattern may be preferred. A distance between two features of the illumination pattern 124 and/or an area of the at least one illumination feature may depend on the circle of confusion in the image. The illumination features of the illumination pattern 124 may be arranged such that only few reference features are positioned on an epipolar line.

Figure 2B:
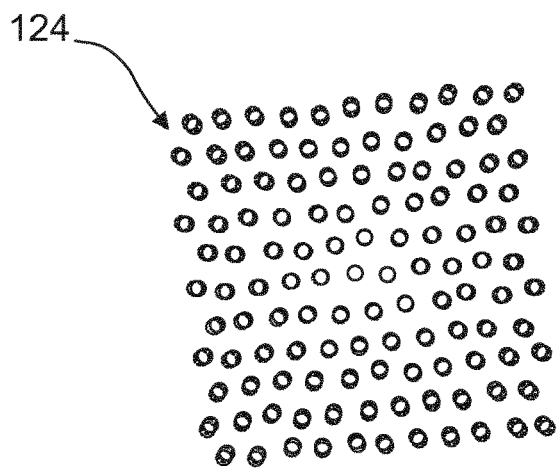

FIG. 2B shows three illumination patterns 124 projected using one DOE with three wavelengths with small variations. This selection of illumination patterns 124 may allow averaging of speckles. All spots of the illumination pattern 124 may be projected at the same distance. The illumination pattern may comprise at least one randomized hexagonal pattern. The spot position shifts may increase with distance from the center of the diffractive optical element 128.

Figure 2C:
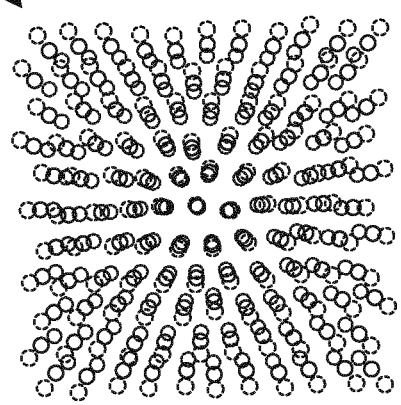

FIG. 2C shows three illumination patterns 124 projected using one DOE with three wavelengths with larger variations. This selection of illumination patterns 124 may allow covering different areas with the spots of the illumination pattern. All spots of the illumination pattern 124 may be projected at the same distance. The illumination pattern may comprise at least one randomized hexagonal pattern. The spot position shifts may increase with distance from the center of the diffractive optical element 128.

Figure 3A:
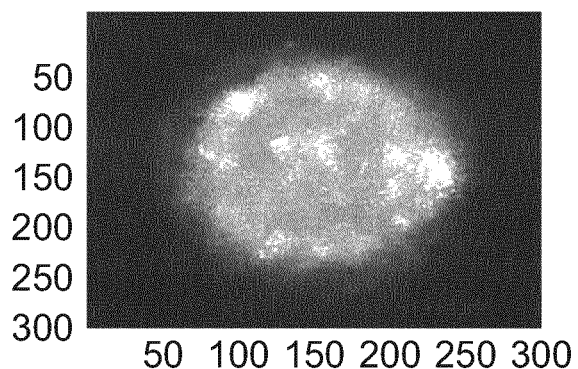
FIGS. 3A and 3B show a light spot recorded with a CMOS of a single laser pulse with a single wavelength and a laser spot recorded with the CMOS of a series of 50 laser pulses with different wavelengths.
Figure 3B:
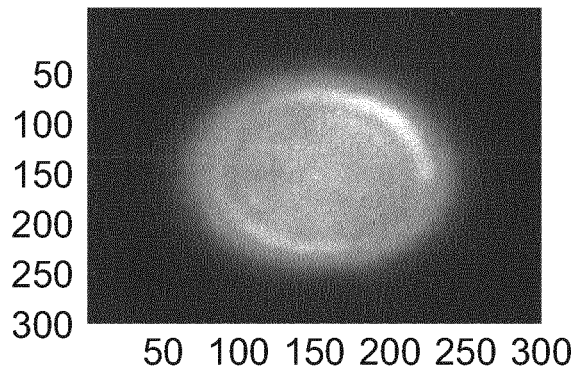

FIG. 3A shows a light spot on white paper recorded with a CMOS of a single laser pulse with a single wavelength. Speckles are visible in the beam profile and surroundings. The intensity of the spot was normalized to the highest value. FIG. 3B shows the same spot recorded with a series of 50 laser pulses with different wavelengths. The intensity of the spot was normalized to the highest value. Speckles were removed by the averaging over 50 images.

Figure 4:
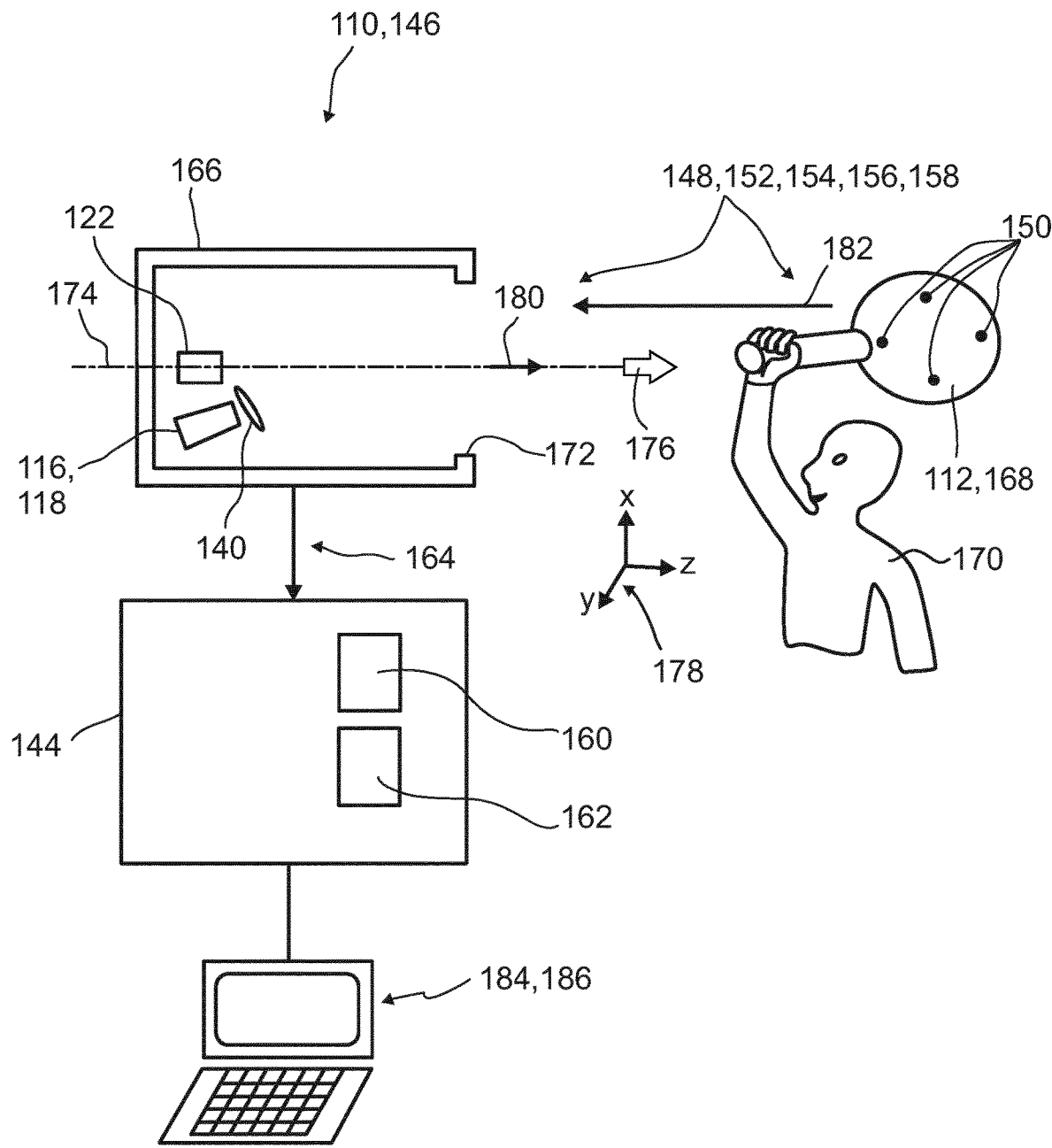
FIG. 4 shows an embodiment of a detector system, camera, entertainment device, tracking system and a scanning system.

FIG. 4 shows, in a highly schematic illustration, an exemplary embodiment of the detector 110, for example, according to the embodiment shown in FIG. 1. The detector 110 specifically may be embodied as a camera 146 and/or may be part of a camera 146. The camera 146 may be made for imaging, specifically for 3D imaging, and may be made for acquiring standstill images and/or image sequences such as digital video clips. Other embodiments are feasible. FIG. 4 further shows an embodiment of a detector system 148, which, besides the at least one detector 110, comprises one or more beacon devices 150, which, in this example, may be attached and/or integrated into an object 112, the position of which shall be detected by using the detector 110. FIG. 4 further shows an exemplary embodiment of a human-machine interface 152, which comprises the at least one detector system 148 and, further, an entertainment device 154, which comprises the human-machine interface 152. The figure further shows an embodiment of a tracking system 156 for tracking a position of the object 112, which comprises the detector system 148. The components of the devices and systems shall be explained in further detail below.

FIG. 4 further shows an exemplary embodiment of a scanning system 158 for scanning a scenery comprising the object 112, such as for scanning the object 112 and/or for determining at least one position of the at least one object 112. The scanning system 158 comprises the at least one detector 110, and, further, optionally, at least one illumination source as well as, optionally, at least one further illumination source, not depicted here. The further illumination source, generally, is configured to emit at least one illumination light beam, such as for illumination of at least one dot, e.g. a dot located on one or more of the positions of the beacon devices 150 and/or on a surface of the object 112. The scanning system 158 may be designed to generate a profile of the scenery including the object 112 and/or a profile of the object 112, and/or may be designed to generate at least one item of information about the distance between the at least one dot and the scanning system 158, specifically the detector 110, by using the at least one detector 110.

As outlined above, the detector 110 comprises at least one evaluation device 144, having e.g. at least one divider 160 and/or the at least one position evaluation device 162, as symbolically depicted in FIG. 4. The components of the evaluation device 144 may fully or partially be integrated into a distinct device and/or may fully or partially be integrated into other components of the detector 110. Besides the possibility of fully or partially combining two or more components, one or more of the optical sensors 118 and one or more of the components of the evaluation device 144 may be interconnected by one or more connectors 164 and/or by one or more interfaces, as symbolically depicted in FIG. 4. Further, the one or more connectors 164 may comprise one or more drivers and/or one or more devices for modifying or preprocessing sensor signals. Further, instead of using the at least one optional connector 164, the evaluation device 144 may fully or partially be integrated into one or both of the optical sensors 118 and/or into a housing 166 of the detector 110. Additionally or alternatively, the evaluation device 144 may fully or partially be designed as a separate device.

In this exemplary embodiment, the object 112, the position of which may be detected, may be designed as an article of sports equipment and/or may form a control element or a further control device 168, the position of which may be manipulated by a user 170. As an example, the object 112 may be or may comprise a bat, a racket, a club or any other article of sports equipment and/or fake sports equipment. Other types of objects 112 are possible. Further, the user 170 himself or herself may be considered as the object 1112, the position of which shall be detected.

As outlined above, the detector 110 comprises optical sensors 118. The optical sensors 118 may be located inside the housing 166. Further, the detector 110 may comprise the at least one transfer device 140 such as one or more optical systems, preferably comprising one or more lenses. An opening 172 inside the housing 166, which, preferably, is located concentrically with regard to an optical axis 174 of the detector 110, preferably defines a direction of view 176 of the detector 110. A coordinate system 178 may be defined, in which a direction parallel or antiparallel to the optical axis 174 may be defined as a longitudinal direction, whereas directions perpendicular to the optical axis 174 may be defined as transversal directions. In the coordinate system 178, symbolically depicted in FIG. 4, a longitudinal direction is denoted by z, and transversal directions are denoted by x and y, respectively. Other types of coordinate systems are feasible, such as non-Cartesian coordinate systems.

One or more light beams 180, such as light beams of the illumination pattern, are propagating from the object 112 and/or from one or more of the beacon devices 150, towards the detector 110. The detector 110 is configured for determining a position of the at least one object 112. The beacon devices 150 and/or at least one of these beacon devices 150 may be or may comprise active beacon devices with an integrated illumination source such as a light-emitting diode. Alternatively, ambient light sources may be used.

The light beam 180, for example generated by the projector 122 such as the at least one illumination patterns 124, may be directed towards the object by using one ore more optical elements. The object 112 may in response to the illumination generate the at least one reflection light beam 182. For details of the evaluation, reference may be made to FIG. 1 above.

As outlined above, the determination of the position of the object 112 and/or a part thereof by using the detector 110 may be used for providing a human-machine interface 152, in order to provide at least one item of information to a machine 184. In the embodiments schematically depicted in FIG. 4, the machine 184 may be a computer and/or may comprise a computer. Other embodiments are feasible. The evaluation device 144 may even be fully or partially integrated into the machine 184, such as into the computer.

As outlined above, FIG. 4 also depicts an example of a tracking system 156, configured for tracking the position of the at least one object 112 and/or of parts thereof. The tracking system 156 comprises the detector 110 and at least one track controller 186. The track controller 186 may be configured to track a series of positions of the object 112 at specific points in time. The track controller 186 may be an independent device and/or may be fully or partially integrated into the machine 184, specifically the computer, as indicated in FIG. 4 and/or into the evaluation device 144.

Similarly, as outlined above, the human-machine interface 152 may form part of an entertainment device 154. The machine 184, specifically the computer, may also form part of the entertainment device 154. Thus, by means of the user 170 functioning as the object 112 and/or by means of the user 170 handling a control device functioning as the object 112, the user 170 may input at least one item of information, such as at least one control command, into the computer, thereby varying the entertainment functions, such as controlling the course of a computer.

LIST OF REFERENCE NUMBERS

110 detector
112 object
114 sensor element
116 matrix
118 optical sensor
120 light-sensitive area
122 projector
124 illumination pattern
126 tunable laser source
128 DOE
130 opening
132 housing
134 optics
136 control unit
138 reflection pattern
140 transfer device
142 reflection image
144 evaluation device
146 camera
148 detector system
150 beacon device
152 human-machine-interface
154 entertainment device
156 tracking system
158 scanning system
160 divider
162 position evaluation device
164 connector
166 housing
168 control device
170 user
172 opening
174 optical axis
176 direction of view
178 coordinate system
180 light beam
182 reflection light beam
184 machine
186 track controller

The invention claimed is:

1. A detector (110) for determining a position of at least one object (112), the detector (110) comprising:
at least one projector (122) for illuminating the object (112) with at least two illumination patterns (124), wherein the projector (122) comprises at least one tunable laser source (126) and at least one diffractive optical element (128), wherein the projector (122) is configured to generate the at least two illumination patterns (124) each comprising a plurality of illumination features by controlling at least one property of the tunable laser source (126), wherein the projector (122) comprises at least one control unit (136), wherein the control unit (136) is configured for controlling the at least one property of the tunable laser source (126), wherein the projector (122) is operable in at least two emission modes, wherein the control unit (136) is configured to adjust the emission mode by applying an electrical signal to the tunable laser source (126), wherein in a first emission mode the tunable laser source (126) has a first emission wavelength $\lambda_1$ and in a second emission mode the tunable laser source (126) has a second emission wavelength $\lambda_2$ different from the first emission wavelength $\lambda_1$, wherein the at least one projector (122) is configured to project the at least two illumination patterns (124) to at least partly differing locations, wherein the at least one control unit (136) is configured to adjust the emission wavelength in steps or continuously thereby adjusting the location of the at least two illumination patterns (124);
at least one sensor element (114) having a matrix (116) of optical sensors (118), the optical sensors (118) each having a light-sensitive area (120), wherein each optical sensor (118) is designed to generate at least one sensor signal in response to an illumination of its respective light-sensitive area (120) by a reflection light beam propagating from the object (112) to the detector (110), wherein the sensor element (114) is configured to determine at least one reflection image (142); and
at least one evaluation device (144), wherein the evaluation device (144) is configured to select at least one reflection feature of the reflection image (142), wherein the evaluation device (144) is configured for determining at least one longitudinal coordinate z of the selected reflection feature of the reflection image (142) by evaluating a combined signal Q from the sensor signals, wherein the at least one evaluation device is configured for deriving the combined signal Q by $$Q(z_o) = \iint A_1 E(x,y;z_o) dxdy / \iint A_2 E(x,y;z_o) dxdy$$

wherein x and y are transversal coordinates, $A_1$ and $A_2$ are different areas of at least one beam profile of the reflection light beam at a position of the sensor element, and $E(x,y,z_o)$ denotes the beam profile given at the object distance $z_o$, wherein each of the sensor signals comprises at least one information of at least one area of the beam profile of the reflection light beam.

2. The detector (110) according to claim 1, wherein the sensor element (114) is configured to determine the reflection image (142) within at least one imaging frame, wherein a duration of a single imaging frame corresponds to a pulse duration of the tunable laser source (126) of the projector (122) or a duration of a series of pulses of the tunable laser source (126) of the projector (122).

3. The detector (110) according to claim 1, wherein the at least one property of the tunable laser source (126) is at least one property selected from the group consisting of a voltage, a current, a temperature, an emission wavelength, and an intensity.

4. The detector (110) according to claim 3, wherein the emission wavelength of the tunable laser source (126) is adjustable by one or more of varying a driver current, changing a MEMS state, or changing the modulation of an electro-optical or acousto-optical modulator.

5. The detector (110) according to claim 1, wherein the control unit (136) is configured to adjust the emission wavelength in steps thereby adjusting the location of the illumination patterns (124), wherein the first emission wavelength $\lambda_1$ and the second emission wavelength $\lambda_2$ are separable, wherein the first emission wavelength $\lambda_1$ and the second emission wavelength $\lambda_2$ differ by 40 nm$\geq |\lambda_1 - \lambda_2| \geq 1$ nm.

6. The detector (110) according to claim 1, wherein the first emission wavelength $\lambda_1$ and the second emission wavelength $\lambda_2$ are stable, wherein variations in wavelength $\Delta\lambda$ are small compared to the wavelength, wherein $\Delta\lambda \leq 1.5\%$.

7. The detector (110) according to claim 1, wherein the tunable laser source (126) is configured to generate at least one light pulse, wherein the light pulse comprises at least one beam profile, wherein the control unit (136) is configured to adjust a wavelength of the light pulse such that the wavelength within the beam profile of the light pulse varies by a wavelength variation $\Delta\Lambda$ by applying an electrical signal to the tunable laser source (126) and/or to adjust wavelengths of light pulses of a series of light pulses such that the wavelengths of at least two light pulses of the series of light pulses vary by the wavelength variation $\Delta\Lambda$.

8. The detector (110) according to claim 1, wherein the evaluation device (144) is configured for deriving the combined signal Q by one or more of dividing the sensor signals, dividing multiples of the sensor signals, dividing linear combinations of the sensor signals, wherein the evaluation device is configured for using at least one predetermined relationship between the combined signal Q and the longitudinal coordinate z for determining the longitudinal coordinate.

9. The detector (110) according to claim 1, wherein the evaluation device (144) is configured to determine a longitudinal region of the selected reflection feature by evaluating the combined signal Q, wherein the longitudinal region is given by the longitudinal coordinate z and an error interval $\pm\epsilon$, wherein the evaluation device (144) is configured to determine at least one displacement region in at least one reference image corresponding to the longitudinal region, wherein the evaluation device (144) is configured to match the selected reflection feature with at least one reference feature within the displacement region, wherein the evaluation device (144) is configured to determine a displacement of the matched reference feature and the selected reflection feature, wherein the evaluation device (144) is configured to determine a longitudinal information of the matched reference feature using a predetermined relationship between the longitudinal information and the displacement.

10. The detector (110) according to claim 9, wherein the reference image and the reflection image (142) are images of the object (112) determined at different spatial positions having a fixed distance, wherein the evaluation device (144) is configured to determine an epipolar line in the reference image.

11. The detector (110) according to claim 10, wherein the displacement region extends along the epipolar line, wherein the evaluation device (144) is configured to determine the reference feature along the epipolar line corresponding to the longitudinal coordinate z and to determine an extent of the displacement region along the epipolar line corresponding to the error interval $\pm\epsilon$.

12. The detector (110) according to claim 11, wherein the evaluation device (144) is configured to perform the following steps:
   determining the displacement region for the image position of each reflection feature;
   assigning an epipolar line to the displacement region of each reflection feature; and
   assigning and/or determining at least one reference feature to each reflection feature.

13. The detector (110) according to claim 9, wherein the evaluation device (144) is configured to match the selected feature of the reflection image (142) with the reference feature within the displacement region by using at least one evaluation algorithm considering the determined longitudinal coordinate z, wherein the evaluation algorithm is a linear scaling algorithm.

14. A detector system (148) for determining a position of at least one object (112), the detector system (148) comprising at least one detector (110) according to claim 1, the detector system (148) further comprising at least one beacon device (150) configured to direct at least one light beam towards the detector (110), wherein the beacon device (150) is at least one of attachable to the object (112), holdable by the object (112) and integratable into the object (112).

15. A human-machine interface (152) for exchanging at least one item of information between a user (170) and a machine (184), wherein the human-machine interface (152) comprises at least one detector system (148) according to claim 14, wherein the at least one beacon device (150) is configured to be at least one of directly or indirectly attached to the user (170) and held by the user (170), wherein the human-machine interface (152) is designed to determine at least one position of the user (170) by means of the detector system (148), wherein the human-machine interface (152) is designed to assign to the position at least one item of information.

16. An entertainment device (154) for carrying out at least one entertainment function, wherein the entertainment device (154) comprises at least one human-machine interface (152) according to claim 15, wherein the entertainment device (152) is designed to enable at least one item of information to be input by a player by means of the human-machine interface (152), wherein the entertainment device (154) is designed to vary the entertainment function in accordance with the information.

17. A tracking system (156) for tracking a position of at least one movable object, the tracking system (156) comprising at least one detector system (148) according to claim 14, the tracking system (156) further comprising at least one track controller (186), wherein the track controller (186) is configured to track a series of positions of the object (112) at specific points in time.

18. A scanning system (158) for determining a depth profile of a scenery, the scanning system (158) comprising at least one detector (110) according to claim 1, the scanning system (158) further comprising at least one illumination source configured to scan the scenery with at least one light beam.

19. A camera (146) for imaging at least one object, the camera comprising at least one detector (110) according to claim 1.

20. A method for determining a position of at least one object (112) by using at least one detector (110) according to claim 1, the method comprising the following steps:
   illuminating the object (112) with at least two illumination patterns (124) generated by at least one projector (122) of the detector (110);
   generating at least two sensor signals in response to an illumination of at least one sensor element (114) having a matrix (116) of optical sensors (118) by at least one reflection light beam propagating from the object (112) to the detector (110), the optical sensors (118) each having a light-sensitive area (120);
   determining at least one reflection image (142) by using the sensor element (114); and
   selecting at least one reflection feature of the reflection image (142) and evaluating the sensor signals by using at least one evaluation device (144), thereby, determining at least one longitudinal coordinate z of the selected reflection feature, wherein the evaluating comprises evaluating a combined signal Q from the sensor signals.

21. The method according to claim 20, wherein the projector (122) comprises at least one tunable laser source (126) and at least one diffractive optical element (128), wherein the method comprises controlling at least one property of the tunable laser source (126) by using at least one control unit (136).

* * * * *